United States Patent
Doberenz

(10) Patent No.: US 11,490,555 B2
(45) Date of Patent: Nov. 8, 2022

(54) TOOL FOR EDGING OR TRENCHING

(71) Applicant: Philip W. Doberenz, Tigard, OR (US)

(72) Inventor: Philip W. Doberenz, Tigard, OR (US)

(73) Assignee: Philip W. Doberenz, Tigard, OR (US)

( * ) Notice: Subject to any disclaimer, the term of this patent is extended or adjusted under 35 U.S.C. 154(b) by 0 days.

(21) Appl. No.: 16/920,684

(22) Filed: Jul. 4, 2020

(65) Prior Publication Data

US 2021/0000002 A1 Jan. 7, 2021

Related U.S. Application Data

(60) Provisional application No. 62/871,118, filed on Jul. 6, 2019.

(51) Int. Cl.
*A01B 1/22* (2006.01)
*A01B 1/08* (2006.01)
*A01B 1/12* (2006.01)

(52) U.S. Cl.
CPC ............... *A01B 1/225* (2013.01); *A01B 1/08* (2013.01); *A01B 1/12* (2013.01)

(58) Field of Classification Search
CPC .. A01B 1/225; A01B 1/08; A01B 1/12; A01G 3/06
USPC ........................................................ 172/378
See application file for complete search history.

(56) References Cited

U.S. PATENT DOCUMENTS

| | | | | |
|---|---|---|---|---|
| 902,983 A | * | 11/1908 | Manahan | A01B 1/02 294/49 |
| 2,285,780 A | | 6/1942 | Newman | |
| 2,568,468 A | * | 9/1951 | Smith | A01G 3/06 172/17 |
| 3,232,351 A | * | 2/1966 | Wilson | A01G 3/06 172/18 |
| 3,293,674 A | | 12/1966 | Sapia | |
| 3,782,770 A | | 1/1974 | Lee | |
| 4,052,791 A | * | 10/1977 | Anesi | A01G 3/06 30/315 |
| 4,096,630 A | | 6/1978 | Honick | |
| D305,604 S | * | 1/1990 | Keblbek | A01G 3/06 D8/7 |
| 5,084,975 A | | 2/1992 | Melter | |
| 5,452,767 A | | 9/1995 | Smotherman | |

(Continued)

FOREIGN PATENT DOCUMENTS

| GB | 191410407 A | * | 2/1915 | ............. A01B 1/225 |
|---|---|---|---|---|
| JP | 2016015951 | | 2/2016 | |

OTHER PUBLICATIONS

Antique Farm Tool 35" Ice or Hay Saw Knife Hand Forged? Wood Handle Barn https://www.ebay.com/itm/373407920284 (accessed Aug. 31, 2021) (Year: 2021).*

(Continued)

*Primary Examiner* — Tara Mayo-Pinnock
(74) *Attorney, Agent, or Firm* — Enterprise Patent LLC

(57) ABSTRACT

A tool comprises a blade operatively connected to a shaft and also comprises a foot plate operatively connected to the blade or the shaft. The tool is adapted for applications including, but not limited to, trenching and edging. In particular, the tool is adapted so the blade can travel forward in an arc without coming completely out of the soil. The blade can be designed to cut through roots up to a limited size.

28 Claims, 12 Drawing Sheets

(56) References Cited

U.S. PATENT DOCUMENTS

| | | | | |
|---|---|---|---|---|
| 5,857,529 | A * | 1/1999 | Nguyen | A01B 1/16 172/378 |
| 9,736,972 | B1 * | 8/2017 | Pope | A01B 1/16 |
| 2003/0230420 | A1 | 12/2003 | Brown | |
| 2006/0288588 | A1 | 12/2006 | Morabito | |
| 2007/0119057 | A1 | 5/2007 | Chen | |
| 2009/0119929 | A1 | 5/2009 | Monnig et al. | |
| 2010/0095532 | A1 | 4/2010 | Fidgen et al. | |

OTHER PUBLICATIONS

Philip W. Doberenz, https://youtu.be/PHftF3H8hlk. Video originally made public on Youtu.be in Dec. 2016, possibly as early as Dec. 1, 2016. (Original posting is not available. Re-uploaded to Youtu.be on Apr. 27, 2020.).

Philip W. Doberenz, https://youtu.be/V5BR38CDXdo. Video originally made public on Youtu.be, possibly as early as Feb. 10, 2018. (Original posting is not available. Re-uploaded to Youtu.be on Apr. 27, 2020.).

Philip W. Doberenz, an ivy removal tool, similar to the one shown in FIG. 11 of U.S. Appl. No. 62/748,417, was demonstrated nine times under verbal or written nondisclosure agreements to individuals and small groups between Feb. 1, 2018 and Sep. 7, 2018.

Folding Ice Saw—Spearing/Sight fishing, downloaded from https://icerunnerhouses.com/folding-ice-saw-spearing-sight-fishing/ (Published Mar. 11, 2020) (Downloaded Aug. 31, 2021).

Greenlee LRF75 75" Foam-Filled Long-Reach Chainsaw, downloaded from https://www.greenleestore.com/products/greenlee-lrf75-75-foam-filled-long-reach-chainsaw?variant=31005490446394&currency=USD&utm_medium=product_sync&utm_source=google&utm_content=sag_organic&utm_campaign=sag_organic&gclid=EAIaIQobChMI1fyJo5nc8gIVdBh9Ch3bRg_sEAQYCCABEgKr7fD_BwE (published Oct. 24, 2020) (Downloaded Aug. 31, 2021).

https://www.youtube.com/watch?v=IYHCR7Oyff0; (published Sep. 14, 2009) How to use a manual edging tool First accessed Apr. 19, 2019.

* cited by examiner

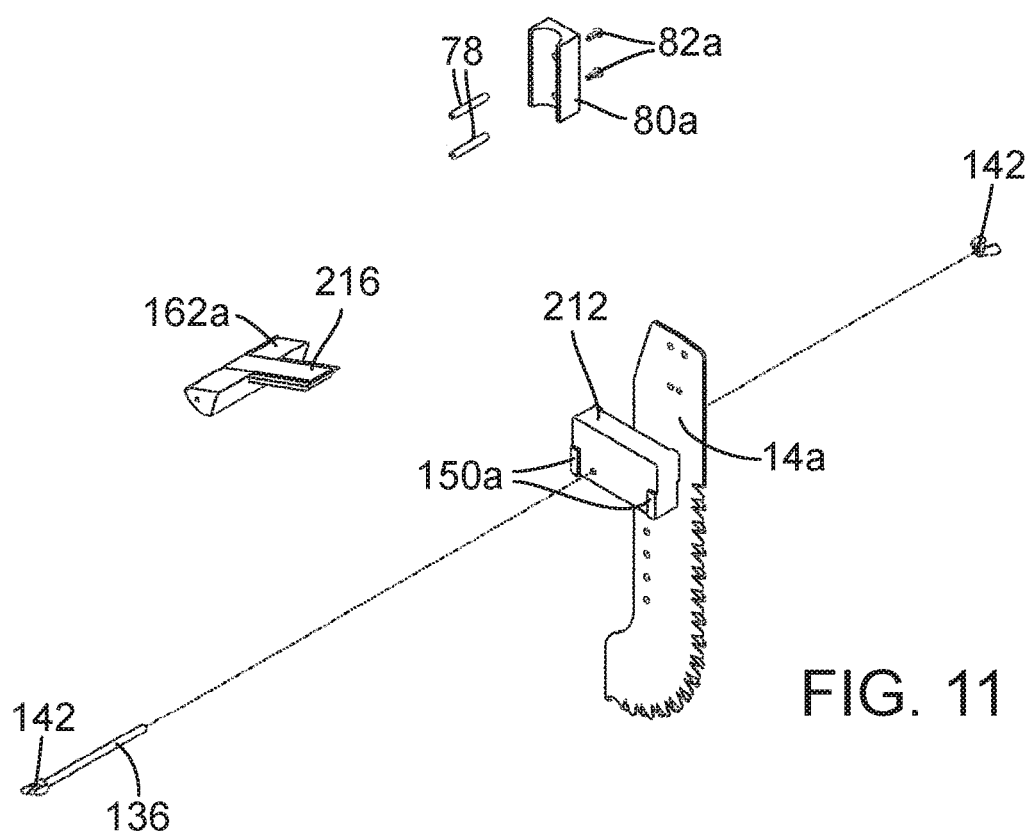

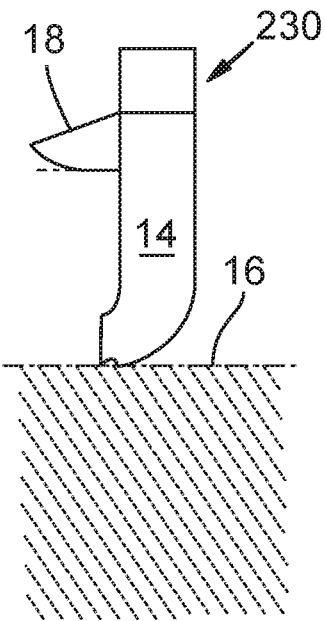
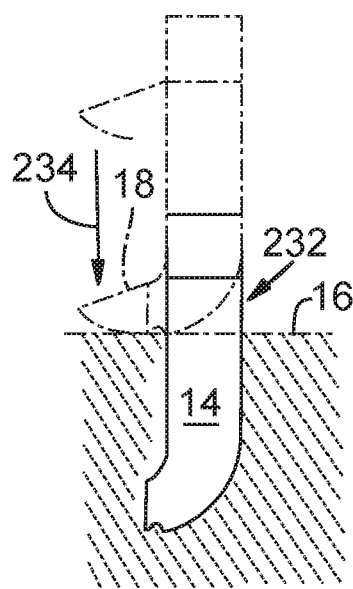
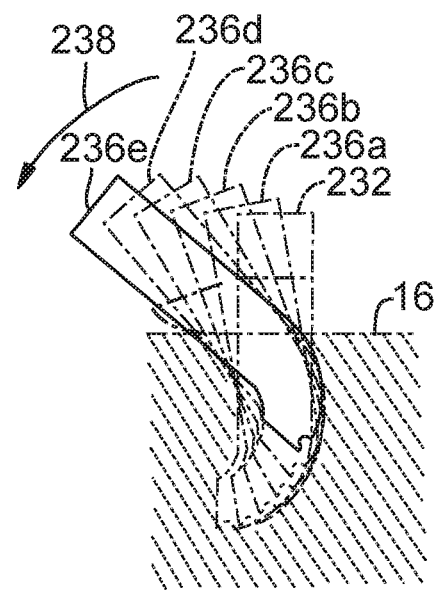
FIG. 12A  FIG. 12B  FIG. 12C
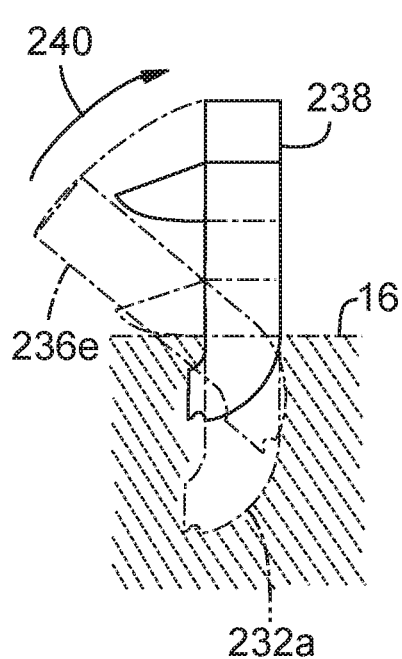
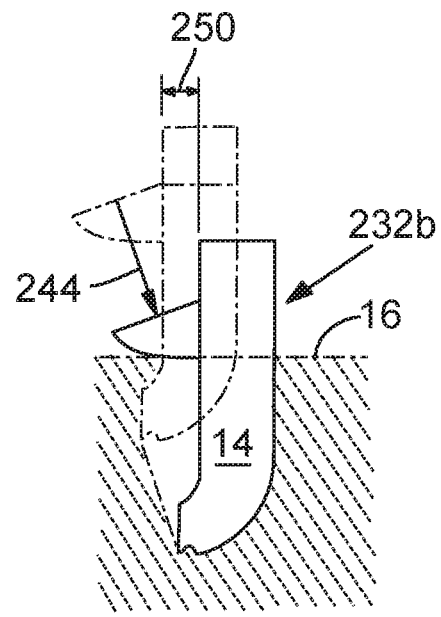
FIG. 12D  FIG. 12E

TOOL FOR EDGING OR TRENCHING

CROSS REFERENCE TO RELATED APPLICATION

This application is a non-provisional application of U.S. Provisional Application No. 62/871,118, which was filed on Jul. 6, 2019, the contents of which are herein incorporated by reference in their entirety for all purposes.

TECHNICAL FIELD

This application relates to systems and methods for edging or trenching and, in particular, to a manual tool for severing roots.

BACKGROUND INFORMATION

Vines are often categorized as woody or herbaceous twining or climbing plants with relatively long stems. The Invasive Plant Atlas lists 145 species vines invasive to U.S. natural areas. These vines are considered to be invasive if present in areas well outside their natural ranges due to human activity. Nuisance vines can be primarily climbing vines such as *wisteria*, ground-cover vines such as *vinca*, or both ground-cover and climbing vines such as ivy. A short list of highly invasive vines includes, but is not limited to, English ivy, Himalayan blackberry, and morning glory.

Nuisance vines are presented herein only by way of example to English ivy (*Hedera helix*). English ivy is an invasive plant species now found in many temperate parts of the world, including the United States. It is destructive to the environment because it outcompetes and grows over native plants forming an "ivy desert" where ivy becomes the dominant, or only, plant species in the area.

Besides covering the ground, ivy also grows up trees. Even though ivy uses trees only as a structure to grow upon, ivy will damage trees when it grows high enough for the ivy leaves to block out light to the trees' own leaves. The added weight and span of the ivy can break branches and cause trees to topple over, especially in windstorms.

English ivy has been a popular cultivar because it's fast growing, hardy, grows in very low light conditions, and is an evergreen plant. Ivy has also been planted as a ground cover for erosion control; however, the root system of ivy is relatively shallow (about 10-13 cm), so it's actually poor for erosion control. Because ivy is abundantly cultivated, birds have easy access to its berries and then distribute the seeds to wild areas where the ivy is unwanted.

Because ivy growing on the ground surface may not root very deeply, ivy can be fairly easy to pull up from soft soil. The green ivy vines growing on the ground may grow to only 0.6 cm diameter, and the vines can be fairly easy to cut. However, ivy can be difficult to remove from harder soils, and the vines can become hard and woody with age. Moreover, ivy vines spread out in all directions, become interwoven with other vines and debris, and are tough to break by hand.

People have tried to use various tools to cut ivy: pruning loppers, hedge clippers, spades, brush axes, etc. with hard work and limited success. Because English ivy is so difficult to remove, people often resort to using toxic chemicals to kill it. Unfortunately, toxic chemicals present their own problems, including destruction of nearby flora and soil and contamination of ground water. Accordingly, a better method for ivy removal, and vine removal in general, is desirable.

Overview of Disclosure

This overview is provided to introduce a selection of concepts in a simplified form that are further described in greater detail below. This overview is not intended to identify key or essential inventive concepts of the claimed subject matter, nor is it intended for limiting the scope of the claimed subject matter.

Conventional tools are not specifically designed for removing vines, particularly bush-like or ground-cover vines such as ivy. Such tools are often unsafe, with exposed sharp edges, and are not meant for cutting that is done near one's feet. Many of these tools cut inconsistently, missing individual vines or cutting them multiple times. Moreover, these tools either don't deal with the roots, or they cut them while underground (making broken pieces more difficult to detect and remove, thereby leaving pieces to keep growing and re-establish the vine structures). Finally, these tools are inefficient, requiring lots of effort per vine cut, often with an operator in stooped over or uncomfortable positions.

In some embodiments, a tool, comprises: a shaft having a shaft length between a shaft upper end and a shaft lower end, wherein the shaft has a shaft frontal plane that extends along the shaft length and forms a first cross-section of the shaft, wherein the shaft has a front portion on a first side of the shaft frontal plane, wherein the shaft has a rear portion on a second side of the shaft frontal plane, and wherein the shaft has a shaft median plane that is transverse to the shaft frontal plane and extends along the length of the shaft and forms a second cross-section of the shaft; a blade operatively connected to the shaft, wherein the blade has a forward edge that faces forward with respect to the shaft frontal plane, wherein the blade has a rearward edge that faces rearward with respect to the shaft frontal plane, and wherein the blade has opposing blade surfaces that are transverse to the shaft frontal plane and operatively connect the forward edge and the rearward edge; and a step operatively connected to the blade or the shaft, wherein the step is operatively connected in proximity to or beneath the shaft lower end, wherein the step has an upper step surface that is transverse to the shaft median plane and the shaft frontal plane.

In some embodiments, a tool, comprises: a blade having a forward edge that includes multiple teeth; a shaft having a shaft major axis and a shaft length along the shaft major axis between a shaft upper end and a shaft lower end, wherein the blade is operatively connected directly or indirectly to the shaft lower end, wherein the shaft is longer than the blade, wherein the shaft has a shaft first cross-sectional dimension that is perpendicular to the shaft major axis, wherein the shaft has a shaft second cross-sectional dimension that is perpendicular to the shaft major axis and the first cross-sectional dimension; and a step operatively connected to the blade or the shaft, wherein the step is operatively connected in proximity to or beneath the shaft lower end, wherein the step has an upper step surface that is transverse to the shaft major axis, wherein the step upper surface has a step first dimension, wherein the step upper surface has a step second dimension that is perpendicular to the step first dimension, and wherein the step first and second dimensions are both greater than or equal to one or both of the shaft first and second cross-sectional dimensions.

In some embodiments, a tool, comprises: a blade having a forward edge that includes multiple teeth; a shaft having a shaft major axis and a shaft length along the shaft major axis between a shaft upper end and a shaft lower end, and wherein the blade is operatively connected to the shaft lower end, wherein the shaft is longer than the blade; a step operatively connected to the blade or the shaft, wherein the step is operatively connected in proximity to or beneath the shaft lower end; and a pivot wheel positioned beneath the step and operatively connected to the blade or the step.

In some embodiments, a tool, comprises: a blade having a forward edge that includes multiple teeth; a shaft having a shaft major axis and a shaft length along the shaft major axis between a shaft upper end and a shaft lower end, wherein the blade is operatively connected to the shaft lower end, wherein the shaft is longer than the blade; and a step operatively connected to the blade or the shaft, wherein the step is operatively connected in proximity to or beneath the shaft lower end, wherein the step has an upper step surface that is transverse to the shaft major axis, wherein the step upper surface has a step first dimension, wherein the step upper surface has a step second dimension that is perpendicular to the step first dimension, and wherein the step first dimension and the step second dimension are greater than 7 cm.

In some embodiments, a tool, comprises: a blade having a forward edge that includes multiple teeth; a shaft having a shaft major axis and a shaft length along the shaft major axis between a shaft upper end and a shaft lower end, wherein the blade is operatively connected to the shaft lower end, wherein the shaft is longer than the blade; and a step operatively connected to the blade or the shaft, wherein the step is operatively connected in proximity to or beneath the shaft lower end, wherein the step has an upper step surface that is transverse to the shaft major axis, wherein the step upper surface has a step major axis and a step minor axis, and wherein the step major axis has a step angle with respect to the shaft major axis such that the step angle is transverse and non-perpendicular to the shaft major axis.

In some embodiments, a tool, comprises: a blade having a blade plane between a forward edge and a rearward edge, wherein the forward edge includes multiple teeth; a shaft having a shaft major axis and a shaft length along the shaft major axis between a shaft upper end and a shaft lower end, wherein the blade is operatively connected to the shaft lower end, wherein the shaft is longer than the blade; and a step operatively connected to the blade or the shaft, wherein the step is operatively connected in proximity to or beneath the shaft lower end, wherein the step has an upper step surface that has a step major dimension that lies in the blade plane and transverse to the shaft major axis.

In some additional, alternative, or selectively cumulative embodiments, a tool comprises: a shaft having a shaft major axis and a shaft length along the shaft major axis between a shaft upper end and a shaft lower end, wherein the shaft has a shaft frontal plane that extends along the shaft length and forms a first cross-section of the shaft having a first cross-sectional dimension that is perpendicular to the shaft major axis, wherein the shaft has a shaft median plane that is transverse to the shaft frontal plane and extends along the length of the shaft and forms a second cross-section of the shaft having a second cross-sectional dimension that is perpendicular to the shaft major axis and the shaft first cross-sectional dimension; a blade operatively connected directly or indirectly to the shaft lower end, wherein the shaft is longer than the blade, wherein the blade has a forward edge that includes multiple teeth and faces forward with respect to the shaft frontal plane, wherein the blade has a rearward edge that faces rearward with respect to the shaft frontal plane, wherein the blade has opposing blade surfaces that are between the forward edge and the rearward edge and are transverse to the shaft frontal plane; and a step operatively connected directly or indirectly to the blade or the shaft, wherein the step has an upper step surface that is transverse to the shaft median plane and the shaft frontal plane, wherein the step upper surface has a step major dimension, wherein the step upper surface has a step minor dimension that is perpendicular to the step major dimension, and wherein the step major and minor dimensions are both greater than or equal to one or both of the shaft first and second cross-sectional dimensions.

In some additional, alternative, or selectively cumulative embodiments, the step major dimension is generally parallel to the shaft median plane or one or both of the blade surfaces.

In some additional, alternative, or selectively cumulative embodiments, the one or more of the opposing blade surfaces is generally parallel to the shaft median plane.

In some additional, alternative, or selectively cumulative embodiments, the shaft has a shaft front axis, wherein the opposing blade surfaces have a blade total surface area, and wherein more than half of the blade total surface area is positioned behind the shaft front axis.

In some additional, alternative, or selectively cumulative embodiments the shaft has a shaft rear axis, wherein the opposing blade surfaces have a blade total surface area, and wherein more than half of the blade total surface area is positioned behind the shaft rear axis.

In some additional, alternative, or selectively cumulative embodiments, the blade is adapted to move beneath a soil surface.

In some additional, alternative, or selectively cumulative embodiments, the tool is adapted for movement of the blade beneath a soil surface.

In some additional, alternative, or selectively cumulative embodiments, the tool is adapted for movement of the blade beneath a soil surface in a forward direction with respect to the frontal plane and the forward edge of the blade.

In some additional, alternative, or selectively cumulative embodiments, the blade is configured to move forward along a cut line of desired length while a portion of the blade remains beneath a ground surface.

In some additional, alternative, or selectively cumulative embodiments, the tool is adapted for movement of the blade beneath a soil surface in a forward arcuate direction with respect to the frontal plane and the forward edge of the blade.

In some additional, alternative, or selectively cumulative embodiments, at least one of the opposing blade surfaces is smooth.

In some additional, alternative, or selectively cumulative embodiments, at least one of the opposing blade surfaces is flat.

In some additional, alternative, or selectively cumulative embodiments, the forward edge of the blade comprises a smooth continuous edge.

In some additional, alternative, or selectively cumulative embodiments, the forward edge of the blade comprises a toothed edge including multiple teeth.

In some additional, alternative, or selectively cumulative embodiments, the forward edge of the blade comprises a toothed edge including multiple saw teeth.

In some additional, alternative, or selectively cumulative embodiments, the forward edge of the blade comprises an edge profile that includes a curve.

In some additional, alternative, or selectively cumulative embodiments, the blade has a side profile that comprises a pronounced curve that extends backwardly.

In some additional, alternative, or selectively cumulative embodiments, the forward edge of the blade has a profile that comprises a curve that extends backwardly with respect to the shaft frontal plane.

In some additional, alternative, or selectively cumulative embodiments, the forward edge of the blade has an edge profile that comprises a curve that supports multiple saw teeth.

In some additional, alternative, or selectively cumulative embodiments, the forward edge is toothless.

In some additional, alternative, or selectively cumulative embodiments, the forward edge comprises teeth.

In some additional, alternative, or selectively cumulative embodiments, the forward edge comprises teeth, and wherein tips of the teeth form a virtual front curve.

In some additional, alternative, or selectively cumulative embodiments, the curve includes a convex portion.

In some additional, alternative, or selectively cumulative embodiments, the curve is complex.

In some additional, alternative, or selectively cumulative embodiments, the curve is simple.

In some additional, alternative, or selectively cumulative embodiments, the curve includes an arc of greater than or equal to 25 degrees.

In some additional, alternative, or selectively cumulative embodiments, the curve includes an arc of greater than or equal to 45 degrees.

In some additional, alternative, or selectively cumulative embodiments, the curve includes an arc of greater than or equal to 60 degrees.

In some additional, alternative, or selectively cumulative embodiments, the curve includes an arc of greater than or equal to 75 degrees.

In some additional, alternative, or selectively cumulative embodiments, the curve includes an arc of greater than or equal to 80 degrees.

In some additional, alternative, or selectively cumulative embodiments, the curve includes an arc of greater than or equal to 85 degrees.

In some additional, alternative, or selectively cumulative embodiments, the curve comprises a radius of curvature that is greater than or equal to 3 cm.

In some additional, alternative, or selectively cumulative embodiments, the curve comprises a radius of curvature that is greater than or equal to 5 cm.

In some additional, alternative, or selectively cumulative embodiments, the curve comprises a radius of curvature that is greater than or equal to 7.5 cm.

In some additional, alternative, or selectively cumulative embodiments, the curve comprises a radius of curvature that is less than or equal to 10 cm.

In some additional, alternative, or selectively cumulative embodiments, the curve comprises a radius of curvature that is less than or equal to 8 cm.

In some additional, alternative, or selectively cumulative embodiments, the shaft has opposing first and second shaft sides that intersect the shaft frontal plane, wherein shaft has first and second shaft side planes that are parallel to the shaft median plane and respectively intersect the shaft frontal plane at the first and second shaft sides, and wherein the entirety of the blade is between the first and second shaft side planes.

In some additional, alternative, or selectively cumulative embodiments, the blade comprises a blade median plane that is parallel to, or coplanar with, the shaft median plane.

In some additional, alternative, or selectively cumulative embodiments, the blade comprises a blade median plane between its opposing blade surfaces, wherein the shaft has opposing first and second shaft sides that intersect the shaft frontal plane, wherein shaft has first and second shaft side planes that are parallel to the shaft median plane and respectively intersect the shaft frontal plane at the first and second shaft sides, and wherein the blade median plane is between the first and second shaft side planes.

In some additional, alternative, or selectively cumulative embodiments, the blade comprises a blade median plane that intersects the forward edge of the blade.

In some additional, alternative, or selectively cumulative embodiments, the blade comprises a blade thickness between the opposing blade surfaces, wherein the blade has a blade forward portion extending in forward direction with respect to the shaft frontal plane, wherein the blade has a blade rearward portion extending in rearward direction with respect to the shaft frontal plane, and wherein a first blade thickness of the blade forward portion is less than or equal to a second blade thickness of the blade rearward portion.

In some additional, alternative, or selectively cumulative embodiments, the blade comprises a blade thickness between the opposing blade surfaces, and wherein the forward edge has an edge thickness that is narrower than or equal to the blade thickness.

In some additional, alternative, or selectively cumulative embodiments, the blade comprises a substantially equal blade width between the forward edge of the blade and the rearward edge of the blade.

In some additional, alternative, or selectively cumulative embodiments, the blade comprises a substantially equal blade average width between the forward edge of the blade and the rearward edge of the blade.

In some additional, alternative, or selectively cumulative embodiments, the blade is adapted to reduce resistance to forward travel.

In some additional, alternative, or selectively cumulative embodiments, the blade comprises a blade width or a blade average width between the forward edge of the blade and the rearward edge of the blade, and wherein the blade width or a blade average width is greater than or equal to 5 cm.

In some additional, alternative, or selectively cumulative embodiments, the blade comprises a blade width or a blade average width between the forward edge of the blade and the rearward edge of the blade, and wherein the blade width or a blade average width is greater than or equal to 7.5 cm.

In some additional, alternative, or selectively cumulative embodiments, the blade comprises a blade width or a blade average width between the forward edge of the blade and the rearward edge of the blade, and wherein the blade width or a blade average width is greater than or equal to 10 cm.

In some additional, alternative, or selectively cumulative embodiments, the blade comprises a blade width or a blade average width between the forward edge of the blade and the rearward edge of the blade, and wherein the blade width or a blade average width is greater than or equal to 12 cm.

In some additional, alternative, or selectively cumulative embodiments, the blade comprises a blade width or a blade average width between the forward edge of the blade and the rearward edge of the blade, and wherein the blade width or a blade average width is less than or equal to 18 cm.

In some additional, alternative, or selectively cumulative embodiments, the blade comprises a blade width or a blade average width between the forward edge of the blade and the rearward edge of the blade, and wherein the blade width or a blade average width is less than or equal to 16 cm.

In some additional, alternative, or selectively cumulative embodiments, the blade comprises an upper blade width between the forward edge of the blade and the rearward edge of the blade in proximity to the shaft, and wherein the forward edge of the blade extends backward from a forwardmost position of the blade edge to behind the shaft frontal plane.

In some additional, alternative, or selectively cumulative embodiments, the blade comprises an upper blade width between the forward edge of the blade and the rearward edge of the blade in proximity to the shaft, and wherein the forward edge of the blade extends backward from a forwardmost position of the blade to beyond the upper blade width.

In some additional, alternative, or selectively cumulative embodiments, the forward edge of the blade is longer than the rearward edge of the blade.

In some additional, alternative, or selectively cumulative embodiments, the rearward edge of the blade comprises a generally linear segment.

In some additional, alternative, or selectively cumulative embodiments, the rearward edge of the blade comprises a curve.

In some additional, alternative, or selectively cumulative embodiments, the blade comprises an end segment between the forward edge of the blade and the rearward edge of the blade.

In some additional, alternative, or selectively cumulative embodiments, the blade comprises an end segment between the forward edge of the blade and the rearward edge of the blade, and wherein the intersection of the end segment with the forward edge of the blade for a blade tip.

In some additional, alternative, or selectively cumulative embodiments, the blade comprises a blade thickness between the opposing blade surfaces, wherein the shaft comprises a minor cross-sectional dimension, and wherein the blade thickness is smaller than the minor cross-sectional dimension.

In some additional, alternative, or selectively cumulative embodiments, the blade comprises a blade thickness that is less than or equal to 0.75 cm.

In some additional, alternative, or selectively cumulative embodiments, the blade comprises a blade thickness that is less than or equal to 0.7 cm.

In some additional, alternative, or selectively cumulative embodiments, the blade comprises a blade thickness that is less than or equal to 0.6 cm.

In some additional, alternative, or selectively cumulative embodiments, the blade comprises a blade thickness that is less than or equal to 0.5 cm.

In some additional, alternative, or selectively cumulative embodiments, the blade comprises a blade thickness that is less than or equal to 0.4 cm.

In some additional, alternative, or selectively cumulative embodiments, the blade comprises a blade thickness that is less than or equal to 0.32 cm.

In some additional, alternative, or selectively cumulative embodiments, the blade comprises a blade thickness that is greater than or equal to 0.2 cm.

In some additional, alternative, or selectively cumulative embodiments, the blade comprises a blade thickness that is greater than or equal to 0.25 cm.

In some additional, alternative, or selectively cumulative embodiments, the blade comprises a blade thickness that is greater than or equal to 0.3 cm.

In some additional, alternative, or selectively cumulative embodiments, the blade comprises a blade thickness that is greater than or equal to 0.35 cm.

In some additional, alternative, or selectively cumulative embodiments, the blade comprises a blade thickness that is greater than or equal to 0.4 cm.

In some additional, alternative, or selectively cumulative embodiments, the blade comprises a blade thickness that is greater than or equal to 0.45 cm.

In some additional, alternative, or selectively cumulative embodiments, a cross-sectional shape of the blade shaft is generally circular.

In some additional, alternative, or selectively cumulative embodiments, a cross-sectional shape of the blade shaft is generally elliptical.

In some additional, alternative, or selectively cumulative embodiments, a cross-sectional shape of the blade shaft is generally rectangular.

In some additional, alternative, or selectively cumulative embodiments, the blade has a blade length extending from the shaft lower end to a blade tip, and wherein the blade length is greater than or equal to 13 cm.

In some additional, alternative, or selectively cumulative embodiments, the blade has a blade length extending from the shaft lower end to a blade tip, and wherein the blade length is greater than or equal to 19 cm.

In some additional, alternative, or selectively cumulative embodiments, the blade has a blade length extending from the shaft lower end to a blade tip, and wherein the blade length is greater than or equal to 25 cm.

In some additional, alternative, or selectively cumulative embodiments, the blade has a blade length extending from the shaft lower end to a blade tip, and wherein the blade length is greater than or equal to 30 cm.

In some additional, alternative, or selectively cumulative embodiments, the blade has a blade length extending from the shaft lower end to a blade tip, and wherein the blade length is less than or equal to 20 cm.

In some additional, alternative, or selectively cumulative embodiments, the blade has a blade length extending from the shaft lower end to a blade tip, and wherein the blade length is less than or equal to 15 cm.

In some additional, alternative, or selectively cumulative embodiments, the blade has a blade length extending from the shaft lower end to a blade tip, and wherein the blade length is smaller than the shaft length.

In some additional, alternative, or selectively cumulative embodiments, the blade has a blade length extending from the shaft lower end to a blade tip, and wherein the shaft length is greater than three times larger than the blade length.

In some additional, alternative, or selectively cumulative embodiments, the blade has a blade length extending from the shaft lower end to a blade tip, and wherein the shaft length is greater than five times larger than the blade length.

In some additional, alternative, or selectively cumulative embodiments, the blade has a blade length extending from the shaft lower end to a blade tip, and wherein the shaft length is greater than seven times larger than the blade length.

In some additional, alternative, or selectively cumulative embodiments, the shaft length is greater than 0.5 meters.

In some additional, alternative, or selectively cumulative embodiments, the shaft length is greater than 0.75 meters.

In some additional, alternative, or selectively cumulative embodiments, the shaft length is greater than 0.9 meters.

In some additional, alternative, or selectively cumulative embodiments, the shaft length is greater than 1 meter.

In some additional, alternative, or selectively cumulative embodiments, the shaft length is greater than 1.2 meters.

In some additional, alternative, or selectively cumulative embodiments, the shaft length is greater than 1.3 meters.

In some additional, alternative, or selectively cumulative embodiments, the blade comprises a blade width between the forward edge of the blade and the rearward edge of the blade, wherein the blade comprises a blade thickness between the opposing blade surfaces, and wherein the blade width is greater than five times larger than the blade thickness.

In some additional, alternative, or selectively cumulative embodiments, the blade comprises a blade width between the forward edge of the blade and the rearward edge of the blade, wherein the blade comprises a blade thickness between the opposing blade surfaces, and wherein the blade width is greater than eight times larger than the blade thickness.

In some additional, alternative, or selectively cumulative embodiments, the front portion of the shaft extends from the shaft frontal plane to a shaft forward face that intersects the shaft median at a shaft front axis, and wherein the forward edge of the blade extends behind the shaft front axis.

In some additional, alternative, or selectively cumulative embodiments, the rear portion of the shaft extends from the shaft frontal plane to a shaft rearward face that intersects the shaft median at a shaft rear axis, and wherein the forward edge of the blade curves backward to extend behind the shaft rear axis.

In some additional, alternative, or selectively cumulative embodiments, the blade has a blade length extending from the shaft lower end to a pointed blade tip.

In some additional, alternative, or selectively cumulative embodiments, the blade has a blade length extending from the shaft lower end to a rounded blade tip.

In some additional, alternative, or selectively cumulative embodiments, the rearward edge is toothless.

In some additional, alternative, or selectively cumulative embodiments, the rearward edge comprises teeth.

In some additional, alternative, or selectively cumulative embodiments, the shaft comprises a minor cross-sectional dimension that is parallel to, or coplanar with, the shaft frontal plane, wherein the shaft comprises a major cross-sectional dimension that is parallel to, or coplanar with, the shaft median plane, and wherein the major cross-sectional dimension is greater than or equal to the minor cross-sectional dimension.

In some additional, alternative, or selectively cumulative embodiments, the step is operatively connected to the blade.

In some additional, alternative, or selectively cumulative embodiments, the step is operatively connected to the shaft.

In some additional, alternative, or selectively cumulative embodiments, the frontal plane has a front face facing the front portion and a rear face facing the rear portion, wherein the step is operatively connected to the blade or the shaft, such that the upper step surface has step angle that is greater than or equal to 90 degrees with respect to the rear face of a shaft portion of the frontal plane.

In some additional, alternative, or selectively cumulative embodiments, the frontal plane has a front face facing the front portion and a rear face facing the rear portion, wherein the step is operatively connected to the blade or the shaft, such that the upper step surface has step angle that is greater than or equal to 93 degrees with respect to the rear face of a shaft portion of the frontal plane.

In some additional, alternative, or selectively cumulative embodiments, the frontal plane has a front face facing the front portion and a rear face facing the rear portion, wherein the step is operatively connected to the blade or the shaft, such that the upper step surface has step angle that is greater than or equal to 95 degrees with respect to the rear face of a shaft portion of the frontal plane.

In some additional, alternative, or selectively cumulative embodiments, the frontal plane has a front face facing the front portion and a rear face facing the rear portion, wherein the step is operatively connected to the blade or the shaft, such that the upper step surface has step angle that is less than or equal to 120 degrees with respect to the rear face of a shaft portion of the frontal plane.

In some additional, alternative, or selectively cumulative embodiments, the frontal plane has a front face facing the front portion and a rear face facing the rear portion, wherein the step is operatively connected to the blade or the shaft, such that the upper step surface has step angle that is less than or equal to 110 degrees with respect to the rear face of a shaft portion of the frontal plane.

In some additional, alternative, or selectively cumulative embodiments, the frontal plane has a front face facing the front portion and a rear face facing the rear portion, wherein the step is operatively connected to the blade or the shaft, such that the upper step surface has step angle that is less than or equal to 100 degrees with respect to the rear face of a shaft portion of the frontal plane.

In some additional, alternative, or selectively cumulative embodiments, the frontal plane has a front face facing the front portion and a rear face facing the rear portion, wherein the step is operatively connected to the blade or the shaft, such that the upper step surface has step angle that is less than or equal to 97 degrees with respect to the rear face of a shaft portion of the frontal plane.

In some additional, alternative, or selectively cumulative embodiments, the step comprises a major dimension that is less than or equal to 31 cm.

In some additional, alternative, or selectively cumulative embodiments, the step comprises a major dimension that is less than or equal to 26 cm.

In some additional, alternative, or selectively cumulative embodiments, the step comprises a major dimension that is less than or equal to 21 cm.

In some additional, alternative, or selectively cumulative embodiments, the step comprises a major dimension that is less than or equal to 16 cm.

In some additional, alternative, or selectively cumulative embodiments, the step comprises a major dimension that is less than or equal to 14 cm.

In some additional, alternative, or selectively cumulative embodiments, the step comprises a major dimension that is greater than or equal to 2.5 cm.

In some additional, alternative, or selectively cumulative embodiments, the step comprises a major dimension that is greater than or equal to 5 cm.

In some additional, alternative, or selectively cumulative embodiments, the step comprises a major dimension that is greater than or equal to 7.5 cm.

In some additional, alternative, or selectively cumulative embodiments, the step comprises a major dimension that is greater than or equal to 10 cm.

In some additional, alternative, or selectively cumulative embodiments, the step comprises a major dimension that is greater than or equal to 12 cm.

In some additional, alternative, or selectively cumulative embodiments, the step comprises a minor dimension that is less than or equal to 21 cm.

In some additional, alternative, or selectively cumulative embodiments, the step comprises a minor dimension that is less than or equal to 16 cm.

In some additional, alternative, or selectively cumulative embodiments, the step comprises a minor dimension that is less than or equal to 13 cm.

In some additional, alternative, or selectively cumulative embodiments, the step comprises a minor dimension that is less than or equal to 11 cm.

In some additional, alternative, or selectively cumulative embodiments, the step comprises a minor dimension that is greater than or equal to 5 cm.

In some additional, alternative, or selectively cumulative embodiments, the step comprises a minor dimension that is greater than or equal to 7.5 cm.

In some additional, alternative, or selectively cumulative embodiments, the step comprises a minor dimension that is greater than or equal to 10 cm.

In some additional, alternative, or selectively cumulative embodiments, the step comprises a major dimension that is greater than the minor dimension.

In some additional, alternative, or selectively cumulative embodiments, the step major dimension and the step minor dimension are both greater than 7 cm.

In some additional, alternative, or selectively cumulative embodiments, the step has a step distal end that is father from the shaft major axis than is a step proximal end, and wherein the step distal end is greater than or equal to 7 cm from the shaft major axis.

In some additional, alternative, or selectively cumulative embodiments, the step is transverse to the surfaces of the blade.

In some additional, alternative, or selectively cumulative embodiments, the blade has a median plane, and wherein the step has dimensions on both sides of the blade median plane.

In some additional, alternative, or selectively cumulative embodiments, the step has dimensions on both sides of the frontal plane.

In some additional, alternative, or selectively cumulative embodiments, the frontal plane has a front face facing the front portion and a rear face facing the rear portion, wherein the step has a greater dimension from the rear face than from the front face of the frontal plane.

In some additional, alternative, or selectively cumulative embodiments, the step comprises a step thickness that is less than or equal to 1.5 cm.

In some additional, alternative, or selectively cumulative embodiments, the step comprises a step thickness that is less than or equal to 1.25 cm.

In some additional, alternative, or selectively cumulative embodiments, the step comprises a step thickness that is less than or equal to 1 cm.

In some additional, alternative, or selectively cumulative embodiments, the step comprises a step thickness that is less than or equal to 0.7 cm.

In some additional, alternative, or selectively cumulative embodiments, the step comprises a step thickness that is greater than or equal to 0.25 cm.

In some additional, alternative, or selectively cumulative embodiments, the step comprises a step thickness that is greater than or equal to 0.5 cm.

In some additional, alternative, or selectively cumulative embodiments, the step comprises a step thickness that is greater than or equal to 0.7 cm.

In some additional, alternative, or selectively cumulative embodiments, the step comprises a plate.

In some additional, alternative, or selectively cumulative embodiments, the step comprises a metal plate.

In some additional, alternative, or selectively cumulative embodiments, the step comprises a high carbon steel.

In some additional, alternative, or selectively cumulative embodiments, the shaft lower end comprises a furrow adapted to receive a tang of the blade.

In some additional, alternative, or selectively cumulative embodiments, the blade is bolted to the shaft.

In some additional, alternative, or selectively cumulative embodiments, the blade is riveted to the shaft.

In some additional, alternative, or selectively cumulative embodiments, the blade is welded to the shaft.

In some additional, alternative, or selectively cumulative embodiments, the frontal plane has a front face facing the front portion and a rear face facing the rear portion, wherein the step is operatively connected to the blade or the shaft, such that the upper step surface has step angle that is variable with respect to the rear face of a shaft portion of the frontal plane.

In some additional, alternative, or selectively cumulative embodiments, a tip of the blade is adapted to inhibit glancing off buried slippery roots.

In some additional, alternative, or selectively cumulative embodiments, the step position with respect to the blade or the shaft is variable.

In some additional, alternative, or selectively cumulative embodiments, the blade has a tip, wherein the upper step surface has a higher step end and a lower step end with respect to the shaft, wherein the higher step end has a step height with respect to the blade tip, wherein the step height is repositionable.

In some additional, alternative, or selectively cumulative embodiments, the blade has a tip, wherein the upper step surface has a higher step end and a lower step end with respect to the shaft, wherein the higher step end has a step height with respect to the blade tip, wherein the step height is repositionable on the blade or the shaft.

In some additional, alternative, or selectively cumulative embodiments, the blade has a tip, wherein the upper step surface has a higher step end and a lower step end with respect to the shaft, wherein the higher step end has a step height with respect to the blade tip, wherein the step height is greater than or equal to 19 cm.

In some additional, alternative, or selectively cumulative embodiments, the blade has a tip, wherein the upper step surface has a higher step end and a lower step end with respect to the shaft, wherein the higher step end has a step height with respect to the blade tip, wherein the step height is greater than or equal to 25 cm.

In some additional, alternative, or selectively cumulative embodiments, the blade has a tip, wherein the upper step surface has a higher step end and a lower step end with respect to the shaft, wherein the higher step end has a step height with respect to the blade tip, wherein the step height is greater than or equal to 30 cm.

In some additional, alternative, or selectively cumulative embodiments, the blade has a tip, wherein the upper step surface has a higher step end and a lower step end with respect to the shaft, wherein the higher step end has a step height with respect to the blade tip, wherein the step height is less than or equal to 30 cm.

In some additional, alternative, or selectively cumulative embodiments, the blade has a tip, wherein the upper step surface has a higher step end and a lower step end with respect to the shaft, wherein the higher step end has a step height with respect to the blade tip, wherein the step height is less than or equal to 25 cm.

In some additional, alternative, or selectively cumulative embodiments, the blade has a tip, wherein the upper step surface has a higher step end and a lower step end with respect to the shaft, wherein the higher step end has a step height with respect to the blade tip, wherein the step height is less than or equal to 20 cm.

In some additional, alternative, or selectively cumulative embodiments, the blade or the shaft comprises multiple height adjustment recesses, holes, or pegs for operable connection of the step to the blade or shaft.

In some additional, alternative, or selectively cumulative embodiments, the step is operatively connected to the blade or the shaft, such that the upper step surface has step angle that is variable with respect to the frontal plane.

In some additional, alternative, or selectively cumulative embodiments, the step is operatively pivotally connected to the blade or the shaft, such that the upper step surface has step angle that is variable with respect to the frontal plane.

In some additional, alternative, or selectively cumulative embodiments, the step height with respect to the blade or the shaft is repositionable within a height range of greater than or equal to 8 cm.

In some additional, alternative, or selectively cumulative embodiments, the step height with respect to the blade or the shaft is repositionable within a height range of greater than or equal to 10 cm.

In some additional, alternative, or selectively cumulative embodiments, the step height with respect to the blade or the shaft is repositionable within a height range of greater than or equal to 12 cm.

In some additional, alternative, or selectively cumulative embodiments, the step height with respect to the blade or the shaft is repositionable within a height range of greater than or equal to 14 cm.

In some additional, alternative, or selectively cumulative embodiments, the blade surfaces are positioned relative to each other to provide minimal resistance to forward travel.

In some additional, alternative, or selectively cumulative embodiments, a fulcrum with respect to the shaft is positioned beneath the step and operatively connected to the blade, the shaft, or the step.

In some additional, alternative, or selectively cumulative embodiments, a pivot mechanism with respect to the shaft is positioned beneath the step and operatively connected to the blade, the shaft, or the step.

In some additional, alternative, or selectively cumulative embodiments, a pivot mechanism with respect to the shaft is positioned beneath the step and operatively connected to the blade, the shaft, or the step, wherein the pivot mechanism has a diameter that is greater than 5 cm.

In some additional, alternative, or selectively cumulative embodiments, the upper step surface has a higher step end and a lower step end with respect to the shaft, wherein a ground stop is positioned beneath the higher step end and is operable to limit downward progress of the blade into the ground.

In some additional, alternative, or selectively cumulative embodiments, the upper step surface has a higher step end and a lower step end with respect to the shaft, wherein a ground stop is positioned beneath the higher step end and is operable to limit downward progress of the blade into the ground, and wherein the ground stop is connected to the blade or the shaft.

In some additional, alternative, or selectively cumulative embodiments, the upper step surface has a higher step end and a lower step end with respect to the shaft, wherein a ground stop is positioned beneath the higher step end and is operable to limit downward progress of the blade into the ground, and wherein the ground stop is adjustably connected to the blade or the shaft.

In some additional, alternative, or selectively cumulative embodiments, the blade has a tip, wherein the upper step surface has a higher step end and a lower step end with respect to the shaft, wherein a ground stop is positioned beneath the higher step end and is operable to limit downward progress of the blade into the ground, and wherein the ground stop has a stop height between its lowest portion and the blade tip that is greater than or equal to 19 cm.

In some additional, alternative, or selectively cumulative embodiments, the upper step surface has a higher step end and a lower step end with respect to the shaft, wherein a ground stop is positioned beneath the higher step end and is operable to limit downward progress of the blade into the ground, and wherein the ground stop has a stop height between its lowest portion and the blade tip that is greater than or equal to 25 cm.

In some additional, alternative, or selectively cumulative embodiments, the blade has a tip, wherein the upper step surface has a higher step end and a lower step end with respect to the shaft, wherein a ground stop is positioned beneath the higher step end and is operable to limit downward progress of the blade into the ground, and wherein the ground stop has a stop height between its lowest portion and the blade tip that is greater than or equal to 30 cm.

In some additional, alternative, or selectively cumulative embodiments, the blade has a tip, wherein the upper step surface has a higher step end and a lower step end with respect to the shaft, wherein a ground stop is positioned beneath the higher step end and is operable to limit downward progress of the blade into the ground, and wherein the ground stop has a stop height between its lowest portion and the blade tip that is less than or equal to 30 cm.

In some additional, alternative, or selectively cumulative embodiments, the blade has a tip, wherein the upper step surface has a higher step end and a lower step end with respect to the shaft, wherein a ground stop is positioned beneath the higher step end and is operable to limit downward progress of the blade into the ground, and wherein the ground stop has a stop height between its lowest portion and the blade tip that is less than or equal to 25 cm.

In some additional, alternative, or selectively cumulative embodiments, the blade has a tip, wherein the upper step surface has a higher step end and a lower step end with respect to the shaft, wherein a ground stop is positioned beneath the higher step end and is operable to limit downward progress of the blade into the ground, and wherein the ground stop has a stop height between its lowest portion and the blade tip that is less than or equal to 20 cm.

In some additional, alternative, or selectively cumulative embodiments, the upper step surface has a higher step end and a lower step end with respect to the shaft, wherein a ground stop is positioned beneath the higher step end and is operable to limit downward progress of the blade into the ground, and wherein the ground stop comprises a circular profile.

In some additional, alternative, or selectively cumulative embodiments, the upper step surface has a higher step end and a lower step end with respect to the shaft, wherein a ground stop is positioned beneath the higher step end and is operable to limit downward progress of the blade into the ground, and wherein the ground stop comprises a wheel.

In some additional, alternative, or selectively cumulative embodiments, the upper step surface has a higher step end and a lower step end with respect to the shaft, wherein a ground stop is positioned beneath the higher step end and is operable to limit downward progress of the blade into the ground, and wherein the ground stop is pivotally connected to the blade or the shaft.

In some additional, alternative, or selectively cumulative embodiments, the upper step surface has a higher step end and a lower step end with respect to the shaft, wherein a ground stop is positioned beneath the higher step end and is operable to limit downward progress of the blade into the ground, and wherein the ground stop comprises a pivotal axis.

In some additional, alternative, or selectively cumulative embodiments, the upper step surface has a higher step end and a lower step end with respect to the shaft, wherein a ground stop is positioned beneath the higher step end and is operable to limit downward progress of the blade into the ground, and wherein the ground stop comprises a pivotal axis that is adjustable with respect to the shaft frontal plane.

In some additional, alternative, or selectively cumulative embodiments, the upper step surface has a higher step end and a lower step end with respect to the shaft, wherein a ground stop is positioned beneath the higher step end and is operable to limit downward progress of the blade into the ground, and wherein the ground stop comprises a pivotal axis at a pivot distance from the shaft frontal plane.

In some additional, alternative, or selectively cumulative embodiments, the upper step surface has a higher step end and a lower step end with respect to the shaft, wherein a ground stop is positioned beneath the higher step end and is operable to limit downward progress of the blade into the ground, wherein the ground stop comprises a pivotal axis at a pivot distance from the shaft frontal plane, and wherein the pivot distance is adjustable.

In some additional, alternative, or selectively cumulative embodiments, the step is operatively movably connected to the blade or the shaft.

In some additional, alternative, or selectively cumulative embodiments, the step is operatively pivotally connected to the blade or the shaft.

In some additional, alternative, or selectively cumulative embodiments, the upper step surface has a higher step end and a lower step end with respect to the shaft, wherein the higher step end is operatively hinged to the blade or the shaft, such that the lower step end is movable upward toward the shaft.

In some additional, alternative, or selectively cumulative embodiments, the upper step surface has a higher step end and a lower step end with respect to the shaft, wherein the lower step end is attached to a step rest (or slider) that extends from the lower step end, wherein the step rest extends under the step and toward the shaft.

In some additional, alternative, or selectively cumulative embodiments, the upper step surface has a higher step end and a lower step end with respect to the shaft, wherein the lower step end is attached to a slider (step rest) that extends from the lower step end, wherein the slider extends under the step and toward the shaft, and wherein the slider has a tail end that is open.

In some additional, alternative, or selectively cumulative embodiments, the upper step surface has a higher step end and a lower step end with respect to the shaft, wherein the lower step end is attached to a step rest that extends from the lower step end, wherein the step rest extends under the step and toward the shaft, and wherein the step rest has a tail end that is operatively connected to an underside of the step In some additional, alternative, or selectively cumulative embodiments, the upper step surface has a higher step end and a lower step end with respect to the shaft, wherein the lower step end is attached to a step rest that extends from the lower step end, wherein the step rest extends under the step and toward the shaft, and wherein the step rest has a tail end that is operatively connected to an underside of the step.

In some additional, alternative, or selectively cumulative embodiments, the upper step surface has a higher step end and a lower step end with respect to the shaft, wherein the lower step end is attached to a step rest that extends from the lower step end, wherein the step rest extends under the step and toward the shaft, and wherein the step rest has a curve with respect to the step.

In some additional, alternative, or selectively cumulative embodiments, the upper step surface has a higher step end and a lower step end with respect to the shaft, wherein the lower step end is attached to a step rest that presents a curve under the step rest and extends from the lower step end toward the higher step end.

In some additional, alternative, or selectively cumulative embodiments, the upper step surface has a higher step end and a lower step end with respect to the shaft, wherein the lower step end is attached to a step rest that presents a convex curve under the step rest and extends from the lower step end toward the higher step end.

In some additional, alternative, or selectively cumulative embodiments, the upper shaft end is operatively connected to a handle.

In some additional, alternative, or selectively cumulative embodiments, the upper shaft end is operatively connected to a "D" handle.

In some additional, alternative, or selectively cumulative embodiments, the upper shaft end is operatively connected to a handle having a "D" handle profile, wherein the "D" is aligned with the shaft frontal plane.

In some additional, alternative, or selectively cumulative embodiments, the upper shaft end is operatively connected to a "D" handle, wherein a linear segment of the "D" is rotatable with respect to a curved portion of the "D."

In some additional, alternative, or selectively cumulative embodiments, the upper shaft end is operatively connected to a "D" handle, wherein the handle is angled from 2 to 15 degrees forward of the shaft frontal plane.

In some additional, alternative, or selectively cumulative embodiments, the upper shaft end is operatively connected to a "D" handle, wherein the handle is angled from 5 to 12 degrees forward of the shaft frontal plane.

In some additional, alternative, or selectively cumulative embodiments, the upper shaft end is operatively connected to a "D" handle, wherein the handle is angled from 7 to 10 degrees forward of the shaft frontal plane.

In some additional, alternative, or selectively cumulative embodiments, the shaft median plane bisects the shaft frontal plane.

In some additional, alternative, or selectively cumulative embodiments, the shaft median plane is perpendicular to the shaft frontal plane.

In some additional, alternative, or selectively cumulative embodiments, the shaft median plane bisects the shaft.

In some additional, alternative, or selectively cumulative embodiments, the shaft frontal plane bisects the shaft.

In some additional, alternative, or selectively cumulative embodiments, the blade has greater than or equal to 5 teeth.

In some additional, alternative, or selectively cumulative embodiments, the blade has greater than or equal to 10 teeth.

In some additional, alternative, or selectively cumulative embodiments, the blade has greater than or equal to 15 teeth.

In some additional, alternative, or selectively cumulative embodiments, the blade has greater than or equal to 20 teeth.

Selectively cumulative embodiments are embodiments that include any combination of multiple embodiments that are not mutually exclusive.

Additional aspects and advantages will be apparent from the following detailed description of exemplary embodiments, which proceeds with reference to the accompanying drawings.

BRIEF DESCRIPTION OF THE DRAWINGS

FIG. 11 is an exploded right and front side perspective view of an embodiment of components of a conversion kit for converting the tool of FIG. 1 into the tool of FIG. 9.

FIGS. 12A-12E are simplified side views of the lower portion of the tool, showing a sequence of steps that demonstrate an example of movement of the tool through the soil.

DETAILED DESCRIPTION OF EXEMPLARY EMBODIMENTS

Figure 1:
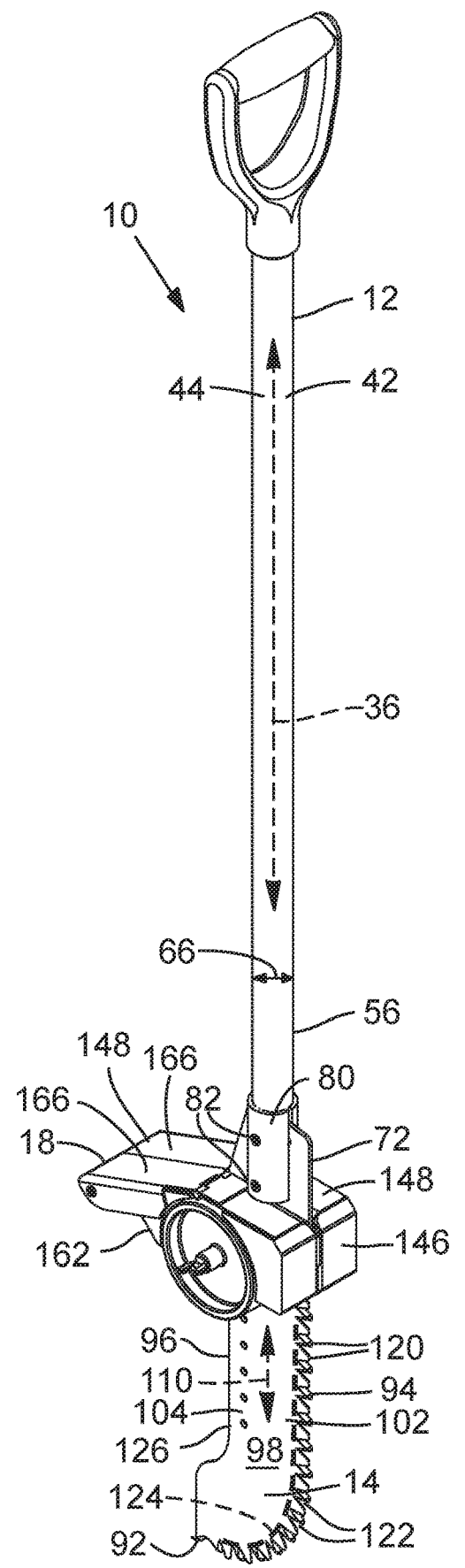
FIG. 1 is a right and front side perspective view of an embodiment of a tool.

Example embodiments are described below with reference to the accompanying drawings. Unless otherwise expressly stated in the drawings, the sizes, positions, etc., of components, features, elements, etc., as well as any distances therebetween, are not necessarily to scale, and may be disproportionate and/or exaggerated for clarity.

The terminology used herein is for the purpose of describing particular example embodiments only and is not intended to be limiting. As used herein, the singular forms "a," "an" and "the" are intended to include the plural forms as well, unless the context clearly indicates otherwise. It should be recognized that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one element could be termed a "first element" and similarly, another element could be termed a "second element," or vice versa. The section headings used herein are for organizational purposes only and are not to be construed as limiting the subject matter described.

Unless indicated otherwise, the terms "about," "thereabout," "substantially," etc. mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Spatially relative terms, such as "right," left," "below," "beneath," "lower," "above," and "upper," and the like, may be used herein for ease of description to describe one element's or feature's relationship to another element or feature, as illustrated in the drawings. It should be recognized that the spatially relative terms are intended to encompass different orientations in addition to the orientation depicted in the figures. For example, if an object in the figures is turned over, elements described as "below" or "beneath" other elements or features would then be oriented "above" the other elements or features. Thus, the exemplary term "below" can, for example, encompass both an orientation of above and below. An object may be otherwise oriented (e.g., rotated 90 degrees or at other orientations) and the spatially relative descriptors used herein may be interpreted accordingly.

Unless clearly indicated otherwise, all connections and all operative connections may be direct or indirect. Similarly, unless clearly indicated otherwise, all connections and all operative connections may be rigid or non-rigid.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

Many different forms and embodiments are possible without deviating from the spirit and teachings of this disclosure and so this disclosure should not be construed as limited to the example embodiments set forth herein.

Figure 2:
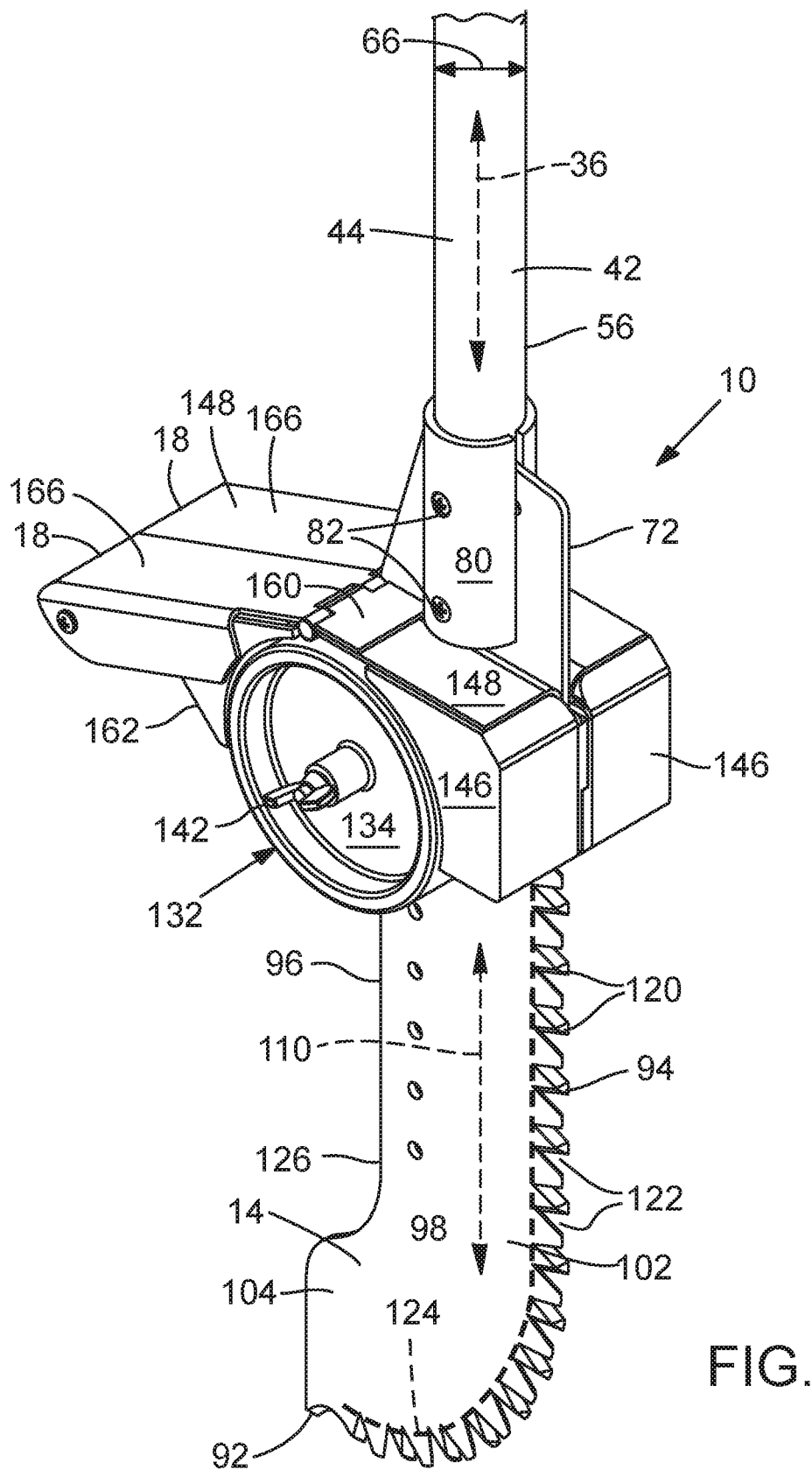
FIG. 2 is an enlarged right and front side perspective view of a portion of the tool shown in FIG. 1.
Figure 3:
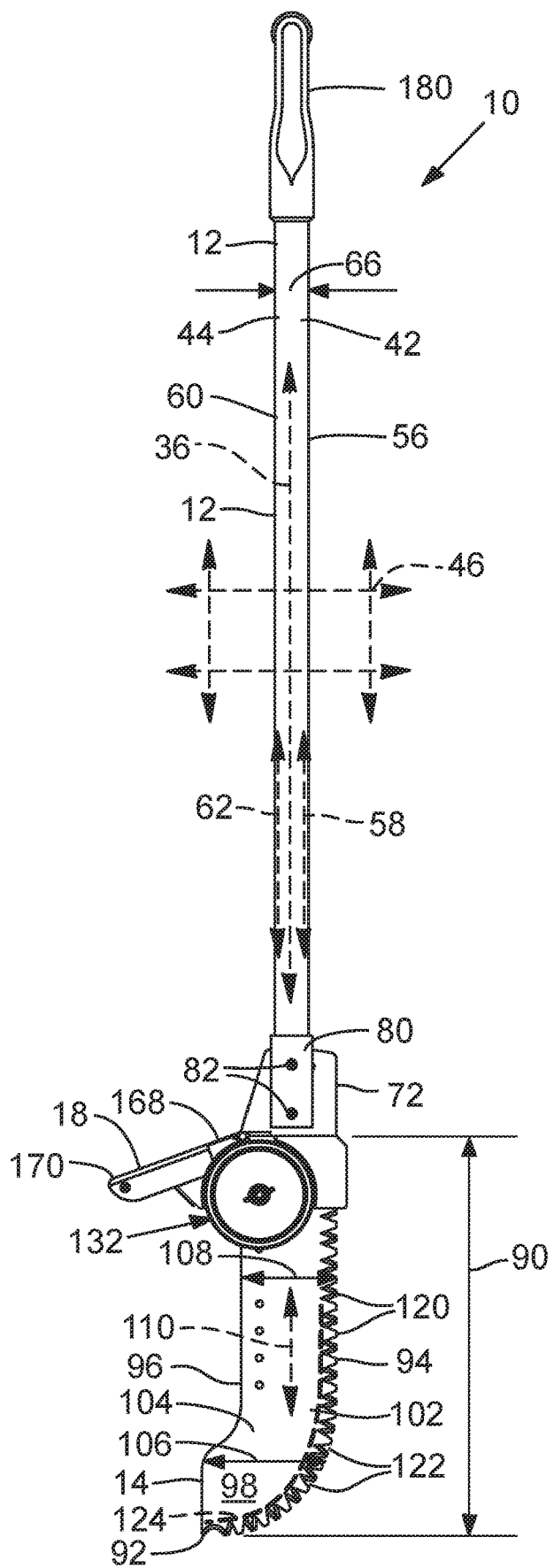
FIG. 3 is a right side view of the tool shown in FIG. 1.
Figure 4:
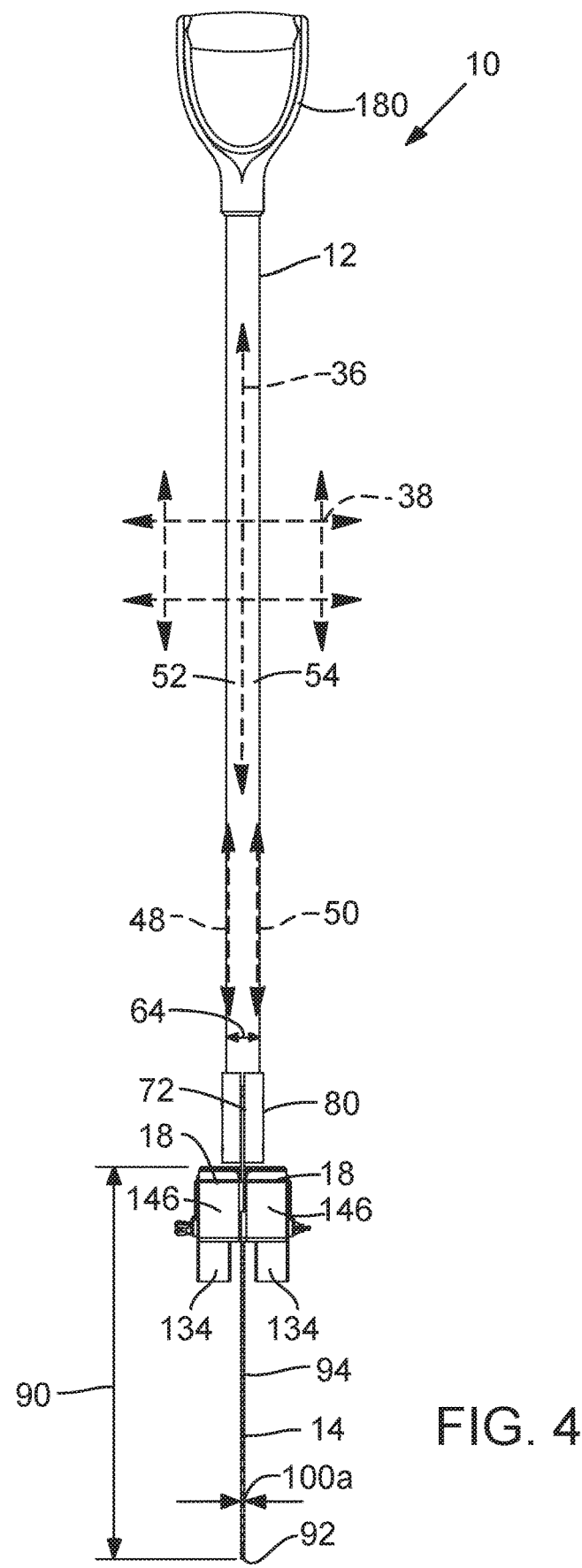
FIG. 4 is a front view of the tool shown in FIG. 1.
Figure 5:
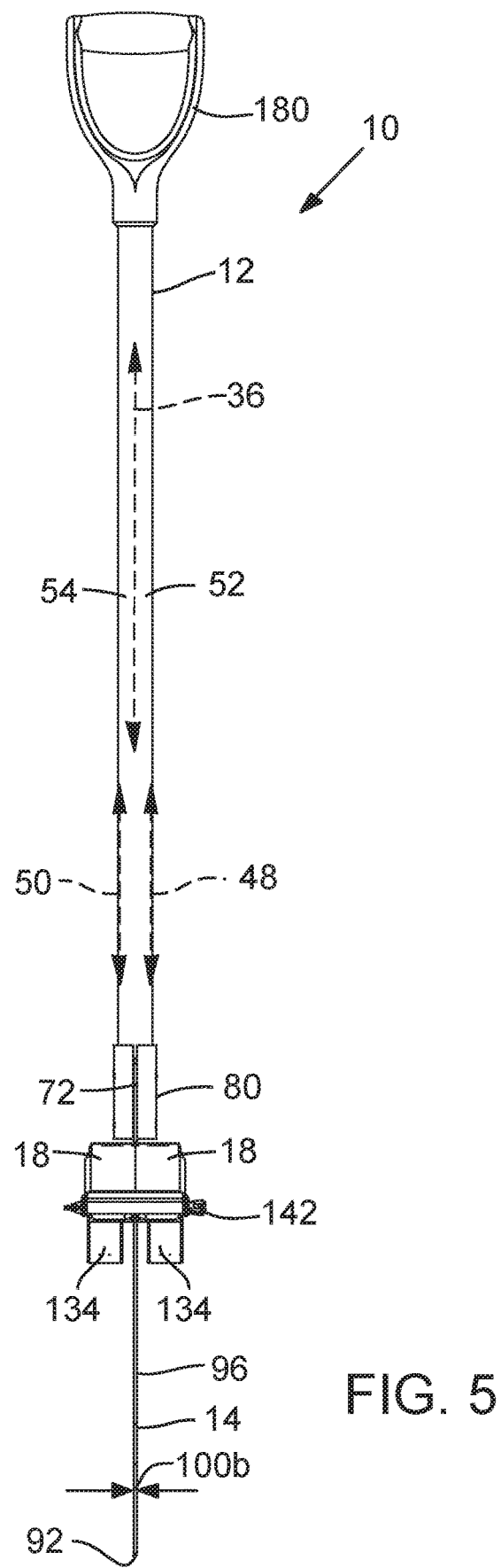
FIG. 5 is a rear view of the tool shown in FIG. 1.
Figure 6:
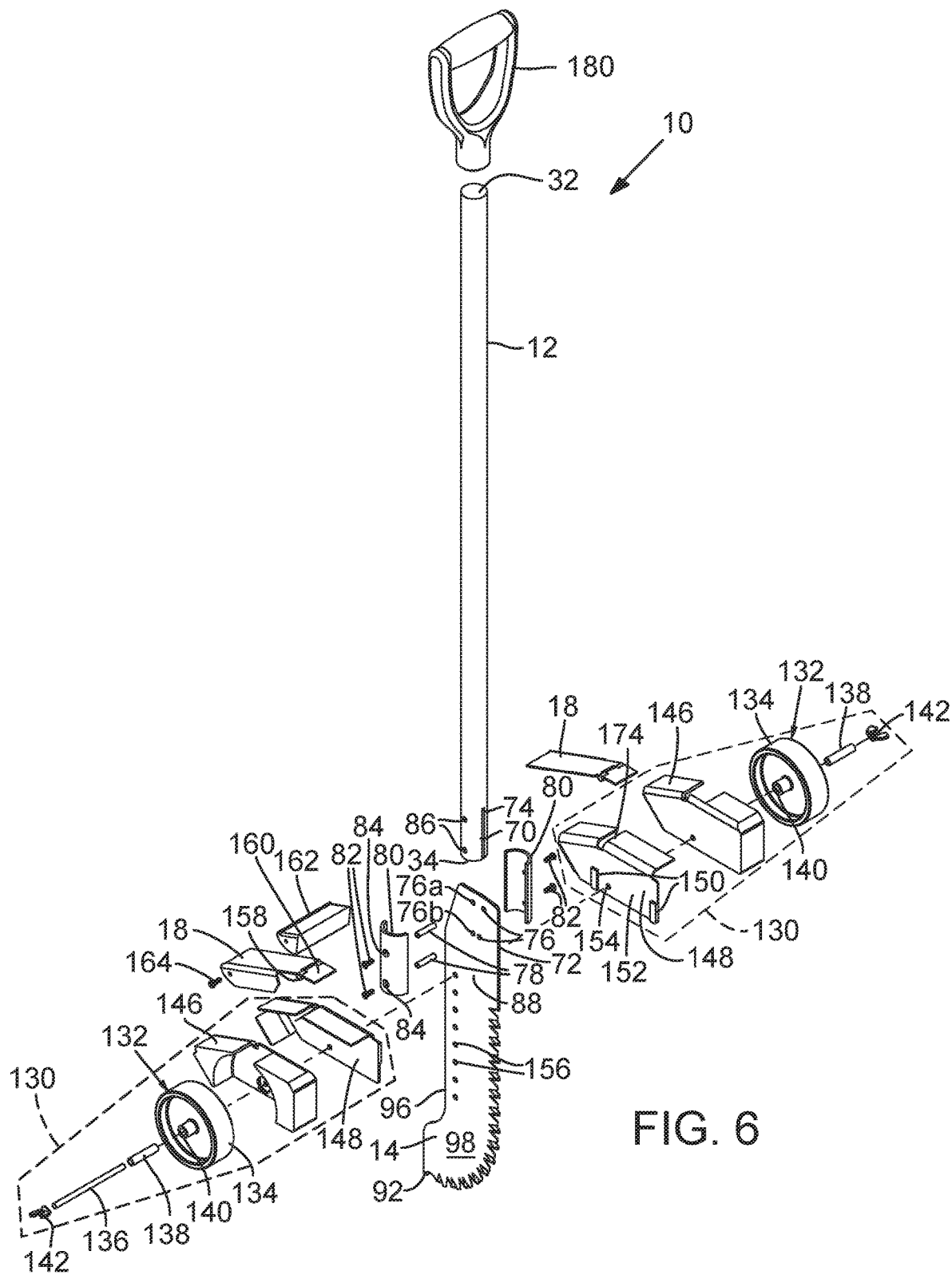
FIG. 6 is an exploded right and front side perspective view of the tool shown in FIG. 1.
Figure 7:
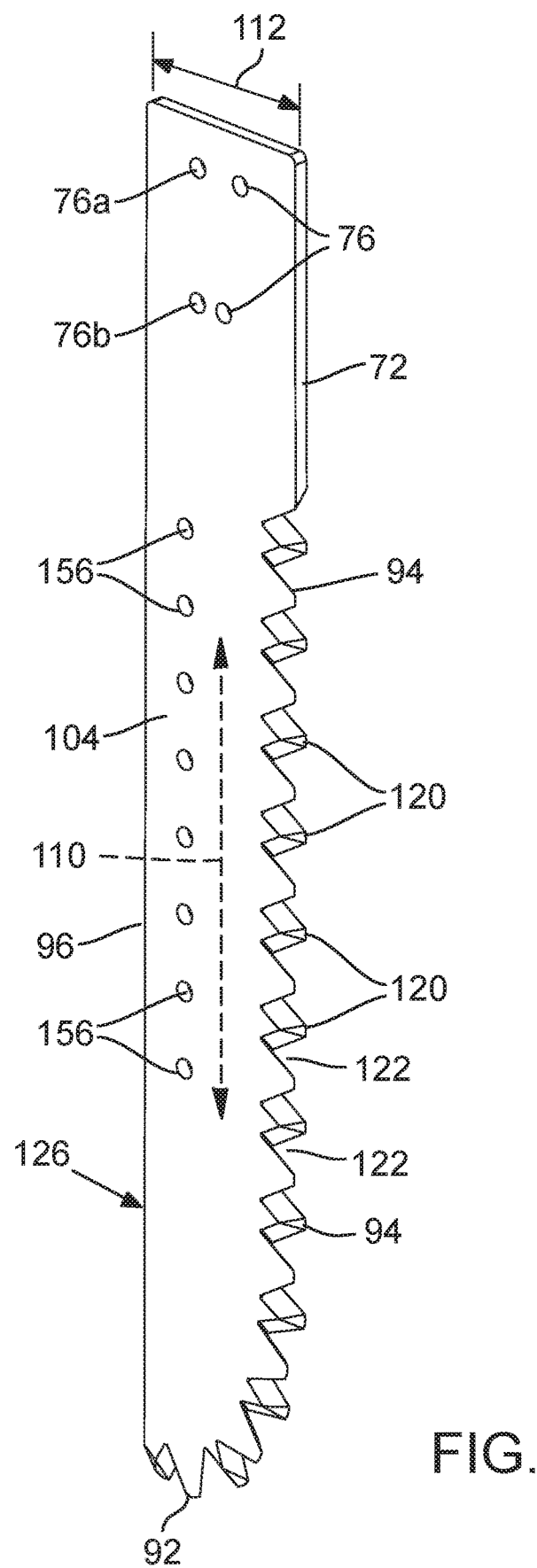
FIG. 7 is a right and front side view of an alternative embodiment of a blade for use in the tool shown in FIG. 1.

FIG. 1 is a right and front side perspective view of an embodiment of a tool 10, such as a manual tool, a hand tool, or an unmotorized tool; FIG. 2 is an enlarged right and front side perspective view of a portion of the tool 10 shown in FIG. 1; FIG. 3 is a right side view of the tool 10 shown in FIG. 1; FIG. 4 is a front view of the tool 10 shown in FIG. 1; FIG. 5 is a rear view of the tool 10 shown in FIG. 1; FIG. 6 is an exploded right and front side perspective view of the tool 10 shown in FIG. 1; FIG. 7 is a right and front side view of an alternative embodiment of a blade 14 for use in the tool shown in FIG. 1; and FIG. 8 is a right side view of an alternative embodiment of the tool 10.

Figure 8:
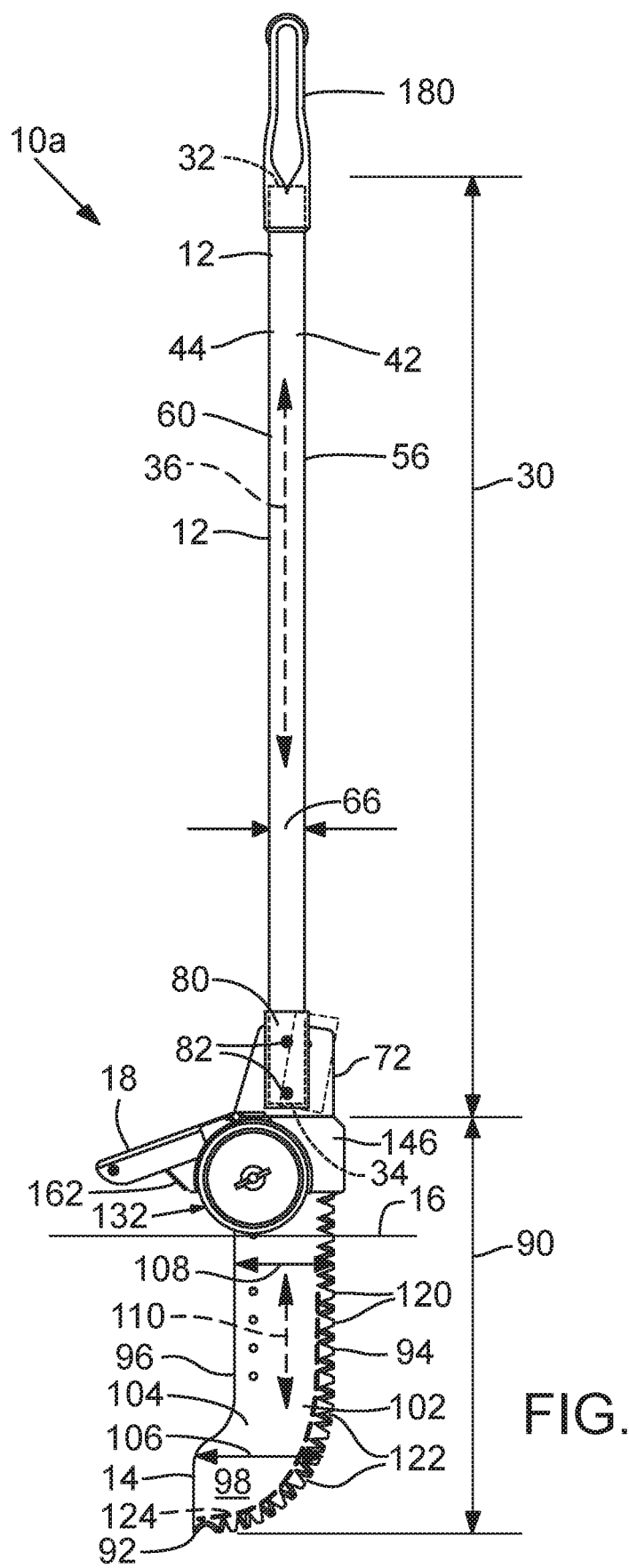
FIG. 8 is a right side view of an alternative embodiment of the tool shown in FIG. 1.

With reference to FIGS. 1-8, an exemplary tool 10 includes a shaft 12 that is operatively connected to a blade 14 adapted for moving through soil containing roots to form a line or trench in the ground 16 (FIG. 8). The tool 10 also includes a step 18 that is operatively connected to the shaft 12 or the blade 14.

The shaft 12 may have a shaft length 30 (FIG. 8) that extends between a shaft upper end 32 (FIG. 6) and a shaft lower end 34 (FIG. 6). The shaft length 30 may lie along a shaft major axis 36. One instance of a shaft major axis 36 may constitute a shaft central major axis. A shaft frontal (coronal) plane 38 (FIG. 4) may extend through the shaft major axis 36 and form a first shaft cross section through the shaft 12, separating a shaft front portion 42 on a first (front) side of the shaft frontal plane 38 from a shaft rear portion 44 on a second (rear) side of the shaft frontal plane 38. The shaft frontal plane 38 may bisect the shaft 12.

A shaft median plane 46 (FIG. 3) may also lie along the shaft major axis 36 (such as the shaft central major axis) and be transverse to (or perpendicular to) the shaft frontal plane 38. The shaft median plane 46 may form a second shaft cross section through the shaft 12, separating a shaft first side portion 52 (such as on a right side) of the shaft median plane 46 from a shaft second side portion 54 (such as on a left side) of the shaft median plane 46. The shaft median plane 46 may bisect the shaft 12.

The shaft 12 may include a shaft minor horizontal cross-sectional dimension 64 that is parallel to, or coplanar with, the shaft frontal plane 38. The shaft 12 may also include a shaft major horizontal cross-sectional dimension 66 that is parallel to, or coplanar with, the shaft median plane 46 (FIG. 3), and the major horizontal cross-sectional dimension 66 is greater than or equal to the minor horizontal cross-sectional dimension 64. One will appreciate that in some embodiments the horizontal cross-sectional dimension 64 may be greater than the horizontal cross-sectional dimension 66.

The shaft front portion 42 may extend from the shaft frontal plane 38 to a shaft front face 56 that may be intersected by the shaft median plane 46 at a shaft front axis 58 (FIG. 3), and the shaft rear portion 44 may extend from the shaft frontal plane 38 to a shaft rear face 60 that may be intersected by the shaft median plane 46 at a shaft rear axis 62 (FIG. 3). In many embodiments, the shaft length 30 (FIG. 8) is greater than or equal to 0.5 meters. The shaft length 30 may also be greater than or equal to 0.75 meters, 0.9 meters, 1 meter, 1.2 meters, or 1.3 meters.

The shaft 12 may have a uniform outer perimeter (or cross section) from the shaft upper end 32 to the shaft lower end 34. Or, the different portions of the shaft 12 may have different shapes and perimeters. The majority of the outer perimeter or cross section may be circular, oblong, elliptical, or other shape. In some embodiments, the shaft upper end 32 and/or the shaft lower end 34 have an outer perimeter (or cross section) that is different than those of other portions of the shaft 12. For example, the shaft lower end 34 may have a shoulder (not shown) that has a larger perimeter or cross-sectional area that is larger than those of other portions of the shaft 12. The shoulder may, for example, have a longer dimension along the shaft median plane 46 than along the shaft frontal plane 38, or the reverse.

The shaft 12 and the blade 14 can be operatively connected in several ways. In some embodiments, the shaft lower end 34 includes a furrow 70 adapted to receive a tang 72 of the blade 14. The furrow 70 is preferably aligned with the shaft median plane 46, but the furrow 70 may be aligned with the shaft frontal plane 38 or with a plane that is parallel to or transverse to either of them. The furrow 70 may include a furrow upper surface 74 that is transverse to, or perpendicular to, the shaft major axis 36.

The furrow 70 may extend from the shaft front face 56 to the shaft rear face 60 and through either or both of the shaft front face 56 and the shaft rear face 60. However, the furrow 70 may be closed at one or both of the shaft front face 56 and the shaft rear face 60. Thus, the tang 72 may extend through one or both of the shaft front face 56 and the shaft rear face 60, or the tang 72 may be completely enclosed within the furrow 70 of the shaft 12. In particular, the tang 72 may have a tang width 112 that may be uniform or may increase in an upward or downward direction, and the tang width 112 may be greater than or equal to the shaft major horizontal cross-sectional dimension 66.

A shaft bracket 80 may alternatively or additionally be used to operatively connect and/or secure the blade 14 to the shaft 12. The shaft bracket 80 may be adapted to fit around the shaft 12 at or towards the shaft lower end 34, such as around the shoulder (if it has one). The shaft bracket 80 may additionally or alternatively connect directly or indirectly to the blade 14 beyond the shaft lower end 34. In some embodiments, the shaft bracket 80 may be adapted to be secured to the shaft 12 in more than one orientation, such as to adjust the angle of the blade 14 with respect to the shaft major axis 36. The shaft bracket 80 may be connected to the shaft 12 in a reversable manner such that the shaft bracket 80 can be repositioned to orient the blade 14 into a different orientation. For example, the shaft bracket 80 can be bolted to the shaft 12. Alternatively, it can be riveted or welded to the shaft 12.

Similarly, the blade 14 can be operatively connected and/or secured to the shaft 12 by a connector 82, such as a bolt, rivet, or a weld. In some embodiments, multiple bolts, rivets, or other connectors may be inserted through bracket holes 84 that extend through the shaft brackets 80 and then into shaft connector holes 86 that may extend through the shaft sides 52 and 54, through the furrow 70, and through shaft tang holes 76 (such as upper shaft tang holes 76a and lower shaft tang holes 76b). In some embodiments, a single connector 82 extends all the way thorough both of the shaft sides 52 and 54, the furrow 70, and the shaft tang holes 76. However, one may appreciate that one or more ferrules or other intermediate connectors 78 may be positioned through the shaft connector holes 86 and configured to receive the connectors 82.

The shaft connector holes 84 may be aligned parallel to, or coplanar with, the shaft major axis 36; they may be aligned transversely to the shaft major axis 36, or they may be positioned both ways or in other ways to provide choices for orientation of the shaft bracket 80 and the blade 14 with respect to the shaft 12, as later described in greater detail. One will appreciate that alternative attachment means for operatively connecting the blade 14 to the shaft 12 could be employed.

The tang 72 may extend from a blade base 88 from which a cutting portion of the blade 14 extends away from the shaft lower end 34. The blade 14 has a blade length 90 that extends from the shaft lower end 34 (or from the blade base 88) to a blade tip 92. The blade length 90 may be greater than or equal to 13 cm, greater than or equal to 19 cm, greater than or equal to 25 cm, or greater than or equal to 30 cm. Additionally or alternatively, the blade length 90 may be less than or equal to 20 cm or less than or equal to 15 cm. Moreover, the blade length 90 is smaller than the shaft length 30. In some embodiments, shaft length 30 is greater than three times larger than the blade length 90, greater than five times larger than the blade length 90, or greater than seven times larger than the blade length 90.

The blade 14 has a forward edge 94 that faces forward with respect to the shaft frontal plane 38, the blade 14 has a spine or rearward edge 96 that faces rearward with respect to the shaft frontal plane 38, and the blade has opposing blade surfaces 98 that are between the forward edge 94 and the rearward edge 96 and are transverse to the shaft frontal plane 38. The blade surfaces 98 may be essentially flat and smooth to minimize resistance to forward travel of the blade 14 through the soil. However, the blade surfaces 98 may include one or more scoops or curved tapers, especially if such features help the blade 14 travel forward beneath the surface of the ground 16.

Between the opposing blade surfaces 98, the blade 14 has a blade thickness (or average blade thickness) 100 that is smaller than the minor horizontal cross-sectional dimension 64. The blade thickness 100 may be less than or equal to 0.75 cm, less than or equal to 0.7 cm, less than or equal to 0.6 cm, less than or equal to 0.5 cm, less than or equal to 0.4 cm, or less than or equal to 0.32 cm. Additionally or alternatively, the blade thickness 100 may be greater than or equal to 0.2 cm, greater than or equal to 0.25 cm, greater than or equal to 0.3 cm, greater than or equal to 0.35 cm, greater than or equal to 0.4 cm, or greater than or equal to 0.45 cm. In some embodiments, the blade 14 has a blade thickness 100 that is substantially the same from the blade base 88 to the blade tip 92. However, the blade base 88 can be thicker than the blade tip 92. In such embodiments, the slope from the blade base 88 to the blade tip 92 can be uniform or non-uniform, can be gradual or steep, or can be curved (either gradual or steep).

The forward edge 94 may have an edge thickness that is narrower than or equal to the blade thickness 100. In some embodiments, the blade 14 has a blade forward portion 102 that extends in forward direction with respect to the shaft frontal plane 38, the blade 14 has a blade rearward portion 104 that extends in rearward direction with respect to the shaft frontal plane 38, and a first blade thickness 100a of the blade forward portion 102 is less than or equal to a second blade thickness 100b of the blade rearward portion 104. In some embodiments, the blade surfaces 98 are generally parallel. However, in some embodiments, the first blade thickness 100a of the blade forward portion 102 is greater than or equal to the second blade thickness 100b of the blade rearward portion 104.

The blade 14 may have a blade major width 106, a blade minor width 108, or a blade average width between the forward edge 94 of the blade 14 and the rearward edge 96 of the blade 14. The blade major width 106, the blade minor width 108, and/or the blade average width may be greater than or equal to 5 cm, greater than or equal to 7.5 cm, greater than or equal to 10 cm, greater than or equal to 12 cm. One will appreciate that the blade major width 106, the blade minor width 108 and/or the blade average width may be smaller than 5 cm.

Additionally or alternatively, the blade major width 106, the blade minor width 108, and/or the blade average width may be less than or equal to 18 cm or less than or equal to 16 cm. One will appreciate that the blade major width 106, the blade minor width 108 and/or the blade average width may be greater than 18 cm. The blade major width 106 is greater than the blade minor width 108. In some embodiments, the blade minor width 108 may be closer than the blade major width 106 to the shaft 12. Moreover, the blade major width 106 may be closer than the blade minor width 108 to the blade tip 92. The blade length 90 may be longer than the blade major width 106, the blade minor width 108, and the blade average width.

Even though the major portion of the forward edge 94 of the blade 14 may lie in front of the shaft frontal plane 38, the blade tip 92 may be positioned behind the shaft frontal plane 38 or even behind the shaft rear face 60. Moreover, even though the major portion of the forward edge 94 of the blade 14 may lie in front of the shaft front face 56, the blade tip 92 may be positioned behind the shaft frontal plane 38 or even behind the shaft rear face 60. Thus, the forward edge 94 of the blade 14 may extend backward from a forward-most position of the blade 14 to beyond the shaft frontal plane 38 or beyond the shaft rear face 60.

The blade 14 may have a blade central axis 110 that lies generally centrally between the forward edge 94 and the rearward edge 96 and is parallel to the blade length 90. The blade central axis 110 may be collinear with the shaft major axis 36. Alternatively, the blade central axis 110 may be positioned at shaft angle with the shaft major axis 36 (or vice versa). For example, the tang 72 may have sets of upper and lower tang holes 76 that align with the shaft connector holes 86 to permit the blade central axis 110 to be collinear with the shaft major axis 36, to be parallel but offset with respect to the shaft major axis 36, or to be at a shaft angle with respect to the shaft major axis 36. FIG. 8 shows in broken lines one example of a shaft orientation having the shaft major axis 36 at a shaft angle with respect to the blade central axis 110.

The forward edge 94 of the blade 14 (or a portion of the forward edge 94) may include multiple teeth 120 separated or spaced apart by gullets 122. The base of the teeth 120 and the gullets 122 may generally define an edge profile 124 of the forward edge 94. The tips of the teeth 120 may also be form a virtual curve. The virtual curve may be generally parallel to the edge profile 124. One will appreciate that if the blade 14 is toothless, then the forward edge 94, itself, may form the edge profile 124.

In some embodiments, the edge profile 124 includes a curve. The curve may extend backwardly toward the shaft frontal plane 38. The curve may be convex, or the curve may be concave. The curve may be simple, or the curve may be complex. In some embodiments, the curve includes an arc of greater than or equal to 25 degrees, greater than or equal to 45 degrees, greater than or equal to 60 degrees, greater than or equal to 75 degrees, greater than or equal to 80 degrees, or greater than or equal to 85 degrees. In some embodiments, the curve includes a radius of curvature that is greater than or equal to 3 cm, greater than or equal to 5 cm, or greater than or equal to 7.5 cm. However, the radius of curvature may be less than or equal to 10 cm or less than or equal to 8 cm.

The lower portion of the blade 14 may have such rounded shape so as to better go into the ground 16. Such shape may also increase leverage by limiting the extent of the forward cut as the shaft 12 is rotated backward. A convex curvature of the lowest portion of the blade 14 may help to prevent the tip 92 from glancing off of buried slippery roots.

The spine or rearward edge 96 may also have an edge profile 126, which can include a straight portion, a curved portion, or both a straight and curved portion. The rearward edge 96 is typically toothless, but it could include teeth. The rearward edge 96 may be flat or sharpened, but it is typically less sharpened that the forward edge 94.

The tool 10 may include a ground stop or ground stop assembly 130 that may include one or more pieces configured to impede, limit, or prevent further downward motion of the blade 14 as it is pushed into the ground 16. In some embodiments, the ground stop assembly 130 may function as a fulcrum. The ground stop assembly 130 can be positioned on one or both sides of the blade 14. The ground stop assembly 130 can be a stationary surface such as a convex or round surface presented to the ground 16. In some embodiments, the ground stop assembly 130 may incorporate a movable component such as a pivot mechanism 132 that may be as a pivot wheel 134 or pivot ball, for example.

In some embodiments, the pivot mechanism 132 or the pivot wheel 134 has a minimum diameter of 1.5", 2", 2.5", 2.75", 3", 3.5", 3.75", or 4". In some embodiments, the pivot wheel 134 has a maximum diameter of 8", 7.5", 7", 6.5", 6", 5.5", 5", or 4.5". In some embodiments, the pivot wheel 134 has a minimum width of 0.25", 0.5", 0.75", or 1". In some embodiments, the pivot wheel 134 has a maximum width of 4", 3.5", 3", 2.5", 2", or 1.5". The pivot wheels 134 may be formed from a durable material such as a plastic or metal.

The ground stop assembly 130 may include one or more axles 136 to movably connect the pivot mechanism 132 directly or indirectly to the blade 14 or the shaft 12. The pivot wheels 134 may also include axle spacers 138 that are slightly longer than the lengths of the axle holes 140 or the widths of the pivot wheels 134 to prevent the pivot wheels from binding when axle wingnuts 142 are tightened around the axles 136.

The ground stop assembly 130 may also include mud guards 146 to impede or prevent mud from accumulating around the pivot wheels 134 and under the steps 18 and their step plate frames 148. The mud guards 146 reinforce the step plate frames 148 and may be formed from a durable material such as a plastic or metal. The step plate frames 148 may have tabs 150 that are spaced apart by the tang width 112 and protrude sufficiently from proximal surfaces 152 of the step frames 148 to extend over the forward and rearward edges of the tang 72 such that the tabs 150 keep the step frames 148 and the steps 18 from rotating with respect to the blade 14.

The axles 136 may secure the mud guards 146 and the step plate frames 148 in proper positions with respect to the pivot wheels 134 via axle holes 154. The axles 136 may also secure the ground stop assemblies 130 to the blade 14 through height adjustment holes 156 in the blade 14 so as to offer multiple choices to the limit the depth that the blade 14 can penetrate the ground 16. In particular, some embodiments of the tool 12 may be adjustable to have a depth shallow enough to edge along a sidewalk (perhaps as little as 4" or 5" depth) or deep enough to provide a slit in the ground for a cable that needs to be buried to the depth of at least 10". The height adjustment holes 156 may be spaced apart by as little a 0.25" or by as much as 2", for example. Alternative or additional sets of connectors and connector holes may be employed to directly or indirectly connect the ground stop assemblies 130 (or their components) to the blade 14 or to the shaft 12.

The step 18 (also called a foot plate) may be connected to the ground stop assembly 130 such as to the step plate frame 148. The step 18 is oriented so that its step upper surface 166 is transverse to the surfaces 98 of the blade 14 and to shaft major axis 36. Generally, the step 18 is positioned rearward of the shaft major axis 36 (and rearward of the shaft central axis) and on one or both sides of the blade 14. In some embodiments, the step 18 may be movably connected to the ground stop assembly 130 such as to the step plate frame 148.

Because a long step 18 could contact the ground if the shaft 12 is pulled back at too much of an angle (which might change the pivot point location away from the location of the pivot wheel 134), the step 18 may be attached to a hinge mechanism so as to rotate upward if the lower end 170 of step 18 comes in contact with the ground 16. For example, the step 18 may be pivotally connected via a hinge pin 158 to a hinge plate 160 that fits through a slot 174 in the step plate frame 148. The hinge plate 158 may be connected to the underside of the step plate frame 148 such as by spot welding. This pivotal connection may permit the step 18 to rotate up when the shaft 12 is rotated back to a point where the step 18 touches the ground. The hinge pin 158 may define a step pivotal axis that may be parallel and adjustable with respect to the frontal plane. In particular, the step pivotal axis may be positionable at an adjustable pivot distance from the shaft frontal plane 38.

If the steps 18 are positioned on both sides of the blade 14, then a foot plate slider (also called a step rest) 162 may be employed to join the two steps 18. Connectors 164, such as foot plate slider screws, may be employed to attach the foot plate slider 162 to each step 18. The foot plate slider 162 may act like a ski when the edge of the steps 18 slide along the ground 16.

In some embodiments, the step 18 has a step upper surface 166 that has a higher (proximal) step end 168 and a lower (distal) step end 170 with respect to the shaft 12, and the ground stop assembly 130 may be positioned beneath the higher step end 168. Moreover, the ground stop assembly 130 may have a stop height (roughly equivalent to a penetration depth of the blade 14 into the ground 16) between its lowest portion and the blade tip 92 that is greater than or equal to 19 cm, greater than or equal to 25 cm, or greater than or equal to 30 cm. Additionally or alternatively, the ground stop assembly 130 may have a stop height between its lowest portion and the blade tip 92 that is less than or equal to 30 cm less than or equal to 25 cm, or less than or equal to 20 cm.

The step upper surface 166 may present a step angle with respect to the shaft rear axis 62. In some embodiments, the step angle is greater than or equal to 90 degrees, greater than or equal to 93 degrees, or greater than or equal to 95 degrees. Additionally or alternatively, the step angle may be less than or equal to 120 degrees, less than or equal to 110 degrees, less than or equal to 100 degrees, or less than or equal to 97 degrees.

The step 18 may be wide enough and long enough to make it comfortable for an operator to push down repeatedly for long periods of time. It's natural to push with the ball of the foot, so the step 18 may be large enough so that a substantial portion of the step 18 is under the ball of the foot. In some embodiments, the step 18 has a major dimension that is less than or equal to 31 cm, less than or equal to 26 cm, less than or equal to 21 cm, less than or equal to 16 cm, or less than or equal to 14 cm. Additionally or alternatively, the step 18 may have a major dimension that is greater than or equal to 2.5 cm, greater than or equal to 5 cm, greater than or equal to 7.5 cm, greater than or equal to 10 cm, or greater than or equal to 12 cm.

The step 18 may have a minor dimension that is less than or equal to 21 cm, less than or equal to 16 cm, less than or equal to 13 cm, or less than or equal to 11 cm. The step 18 may have a minor dimension that is greater than or equal to 5 cm, greater than or equal to 7.5 cm, or greater than or equal to 10 cm. The step major dimension is greater than or equal to the step minor dimension. Both the step major dimension and the step minor dimension may be greater than or equal to one or both of the shaft minor horizontal 64 and the shaft major horizontal cross-sectional dimension 66.

The step 18 may have a step thickness that is less than or equal to 1.5 cm, less than or equal to 1.25 cm, less than or equal to 1 cm, or less than or equal to 0.7 cm. However, the step thickness may be greater than or equal to 0.25 cm, greater than or equal to 0.5 cm, or greater than or equal to 0.7 cm. The step 18 may include a plate of metallic material, such as high carbon steel, or it made be made of another durable material.

To prevent the lower end 170 of the step 18 from digging into the ground if the angle of the shaft 12 is pulled back far enough so that the step 18 contacts the ground 16, the bottom side of the lower end 170 of the step 18 may be provided with a ramp, so as to be able to slide forward and backward with minimal resistance.

The upper end 32 of the shaft 12 may be operatively connected to a handle 180, such as a "D" handle or a handle having a "D" profile. In some embodiments, the handle 180 is glued or riveted to the shaft 12, and the "D" may be aligned with the shaft frontal plane 38. The linear segment of the "D" may be rotatable with respect to a curved portion of the "D." In some embodiments, the handle 180 is angled from 2 to 15 degrees forward of the shaft frontal plane 38, from 5 to 12 degrees forward of the shaft frontal plane 38, or from 7 to 10 degrees forward of the shaft frontal plane 38.

In some embodiments, a narrower version of the tool 10 may employ essentially the same components, but accommodate a narrower blade 14, in other words the blade major width 106 and/or the blade minor width 108 may be narrower. Such narrower blade 14 may be useful for very thick ivy. Such a narrow version may be just as long and perhaps thinner so that it may more readily move through heavy vines and roots.

Figure 9:
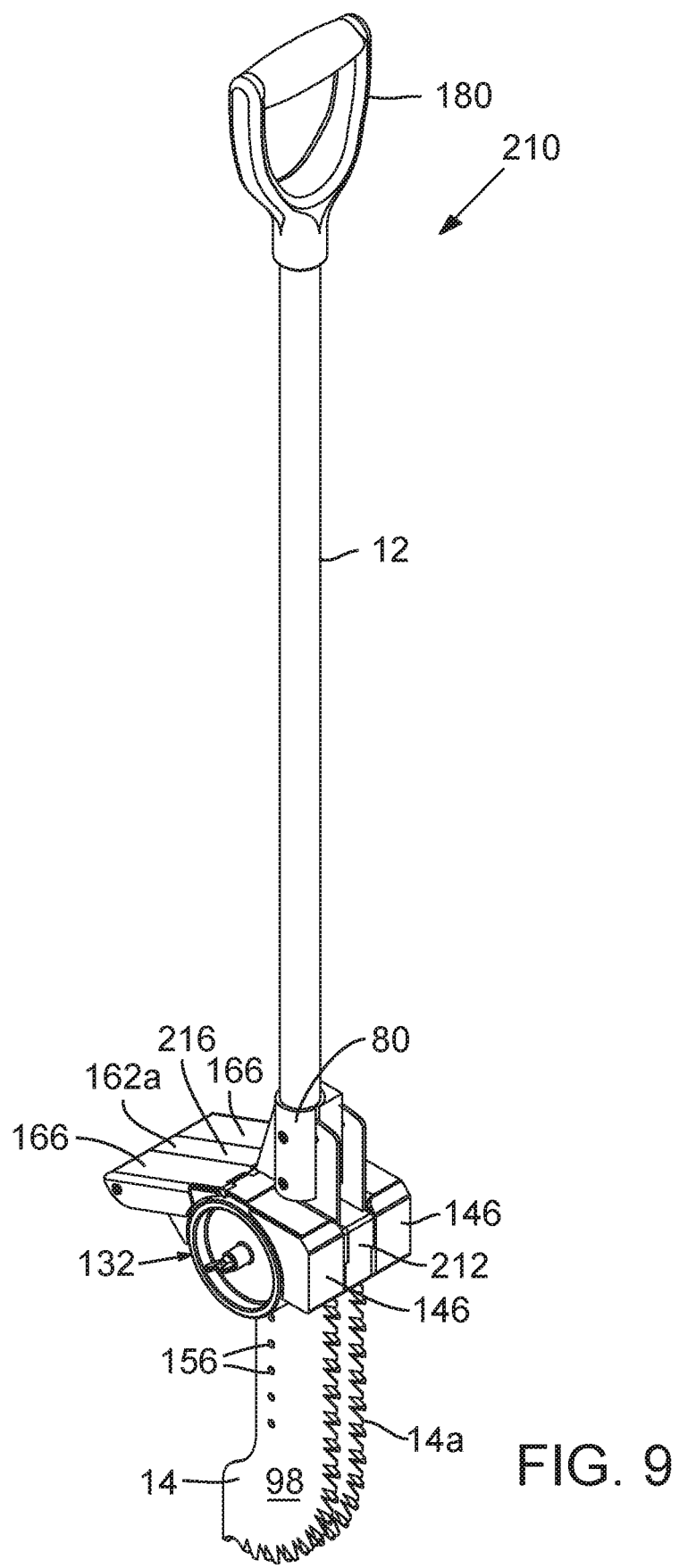
FIG. 9 is a right and front side perspective view of an alternative embodiment of the tool employing two blades.
Figure 10:
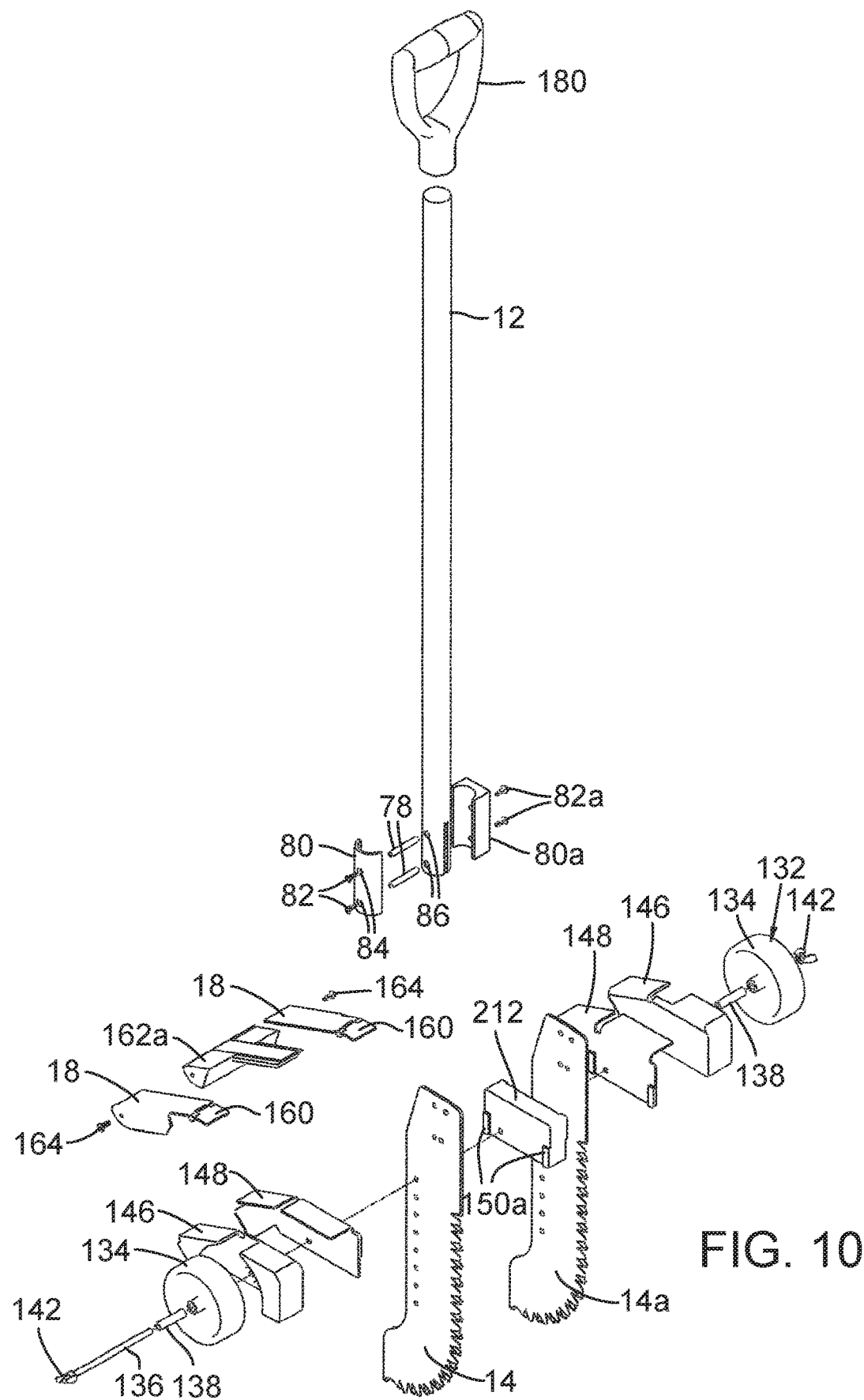
FIG. 10 is an exploded right and front side perspective view of the tool shown in FIG. 9.

Alternatively, creating a wider trench may be useful such as for applications not associated with removing vines, such as for creating a wide trench for laying a pipe. FIGS. 9-11 show a configuration and components of a double-bladed tool 210. In particular, FIG. 9 is a right and front side perspective view of the tool 210 that employs two blades 14 and 14a; FIG. 10 is an exploded right and front side perspective view of the tool 210 shown in FIG. 9; and FIG. 11 is an exploded right and front side perspective view of an embodiment of a components of a conversion kit for converting the tool 10 of FIG. 1 into the tool 210 of FIG. 9.

With reference to FIGS. 9-11, components employed in the tool 210 that are employed in the tool 10 will be labeled with similar reference numerals for convenience. The tool 210 can be used for creating a wide trench and may employ two blades 14 and 14a that are spaced apart by a trench width. For this purpose, one or more spacer blocks 212 can be positioned between the blade surfaces 98 of the blades 14 and 14a. These spacer block(s) 212 may include tabs 150a similar to the tabs 150 on the step plate frames 148 to secure the edges of the tangs 72.

These spacer blocks 212 may be supplied in different thicknesses to facilitate the spacing of the blades 14 and 14a for trenches of different trench widths. Some potential thicknesses for the spacer blocks 212 include 1.5", 2.5", 3.5", and 4.5". In other embodiments, spacer blocks or 0.5", 1", 2", and 2" may be provided to permit different combinations of additive sizing. One will appreciate that some spacer blocks 212 in sets for combination may include indentions on at least one side to accommodate the tabs 150 (in the event that spacing between the blocks 212 is determined to be undesirable).

In embodiments in which the axle(s) 136 extend through the height adjustment holes 156 in the blades 14 and 14a, then the axle(s) 136 may need to be longer. Similarly, the intermediate connectors 78 may need to be longer to accommodate a shaft bracket 80a that has an exterior flat surface 214 configured to rest against the tang 72 of the second blade 14a. Additionally, the tool 210 may include a longer foot plate slider 162a to account for the blade separation distance. The foot plate slider 162a may also include a tongue 216 that is adapted to extend to the spacer block(s) 212.

Accordingly, a kit for converting the tool 10 into the tool 210 may include the blade 14a, the longer axle 136 (or longer alternative connectors), the foot plate slider 162a, one or more spacer blocks 212, longer axle spacers 138, optional alternative connectors 82a, longer intermediate connectors 78, a longer foot plate slider 162a, and a shaft bracket 80 having one side configured for resting against the tang 72 of the blade 14a. These components are shown in FIG. 11.

One will appreciate that the tool 210 as configured in FIG. 9 has blades 14 and 14a that are asymmetrically spaced with respect to the shaft 12. In an alternative embodiment of the double-bladed tool 210, the spacer block 212 may be configured to have from its upper surface a projection similar to the tang 72 to extend into the furrow 70 of the shaft lower end 34. The shaft bracket 80 would be replaced with a second shaft bracket 80a. Neither of the tangs of the blade 14 and 14a would be positioned in the furrow, and the blades would be equally spaced from the shaft. The converter kit would be essentially the same except it would include two shaft brackets 80a and the tang-modified spacer block 212.

The double-bladed tool 210 would cut parallel slits and then a scoop type of shovel could be used to scoop out the dirt between the slits. The entire process would be much faster than using the shovel alone (without the slits), and the edges of the resulting trench would be much more uniform and cleaner than made with a shovel alone.

FIGS. 12A-12E are simplified side views of the lower portion of the tool 10, showing a sequence of steps that demonstrate an example of movement of the tool 10 through and along the ground 16 to form a cut line. In particular, FIG. 12A shows the tool 10 in a possible starting tool position 230 above the ground 16.

FIG. 12B shows the tool 210 entering the ground 16 to about the bottom of the ground stop assembly 130 at a tool position 232. In general, a tool operator will place a foot on one of the steps 18 or on top of the step plate frames 142 to sink the blade 14 into the ground 16. If the foot applies force in the downward direction 234 on the top of the step plate frame(s) 142, then the blade 14 may have more of a completely vertical trajectory as shown. However, if the foot applies force to the steps 18, then the angle of the steps 18 may drive the blade 14 forward as well as down so that the downward trajectory may be angled slightly forward. The pivot wheel 134 (or other attachment under the step 18 or step plate frame 148) can help to limit the depth to which the blade 14 penetrates the ground 16. The prior tool position 230 is shown in broken lines.

FIG. 12C shows a sequence of tool positions 236a, 236b, 236c, 236d, and 236e, (collectively positions 236) that may occur as the handle 180 and shaft 12 are pulled backward in a direction 238 toward the rearward edge 96 and the ground 16. The pivot mechanism 132 causes the tool 10 and particularly the blade 14 to rotate in an arc that causes the blade 14 to move upward and forward from a tool position 232 to a tool position 236e.

FIG. 12C shows a possible tool position 238 after the handle 180 and shaft 12 are moved in a direction 240 forward and upward. The tool position 238 may be forward of the tool position 232 in FIG. 12B and the blade 14 may be elevated with respect to the tool position 232. However, the blade 14 in the tool position 238 may still partially be in the cut slit. In some instances, the blade 14 may not be elevated and may exhibit a tool position 232a that may be at a similar elevation to that of the tool position 232. In this situation, the next step would entail pulling the shaft 12 backward causing the blade 14 to move as shown in FIG. 12C.

However, if the movement shown in FIG. 12D results in a position that is more similar to the tool position 238, then the next step may be that shown in FIG. 12E, wherein a foot applies force in the downward and forward direction 244. The blade 14 would achieve a new submerged tool position 232b that may be at a depth that may be similar to the tool position 232, but the blade 14 would be displaced forward by a trench step distance 250. The cycle can be repeated until a trench or cut line of desired length is achieved.

Depending on how far above the maximum cutting depth (as limited by the ground stop assembly 130), and how far back the pivot point is from the shaft frontal plane 38, the blade 14 under the ground 16 may rotate roughly at the pivot point. This rotation may cause the forward edge 94 to arc up and forward from its position before being rotated. If the pivot point is closer to the shaft frontal plane 38, then the blade 14 may travel farther forward as it arcs upward, which may be desirable in soft soil without obstructions. So, the trench step distance 250 for each cycle may be greater in these circumstances.

If there are more denser obstructions, or an especially a big obstruction (like a root) that might justify multiple strokes, then utilizing a pivot point farther away from the shaft frontal plane 38 may have some advantages, so that the forward arc motion is less, and the upward and forward stroke exerts more force due to leverage. Thus, the pivot point can be made to have an adjustable position. In some embodiments, the pivot point can be readily adjusted by threading the axle through a different height adjustment hole 156 made in the blade 14. In some embodiments, rows of the height adjustment holes 156 may be spaced apart by at least 1" vertically, and columns of the height adjustment holes 156 may be spaced apart by at least 1" horizontally. The number of rows may be 5 or greater, and the number of columns may be 3 or greater, for example.

Because it may be desirable to have the pivot point movable for different depths and soil conditions, the pivot point may be expressed as one or more wheels, associated with the ground stop assembly 130, that can roll back as the handle is pulled backwards. In easy soil conditions, maintaining a foot on the step 18 can prevent the pivot wheel 134 from rolling backwards, thereby making more forward progress for each stroke. And if the upward arc movement of the blade 14 hits an obstruction, the pivot wheel 134 could be forced backward harder, and if the operator lets it move backwards, then it will automatically get into a position with better leverage to force against the obstruction.

For the stepdown-rotate cycle to make desirable forward progress, the handle 180 and shaft 12 may rotate backward as much as 40 degrees or more. In order to make it easier to pull back 40 degrees without having to twist and bend and twist, a part of the 40 degrees could be forward of the shaft frontal plane 38, at a forward-facing angle that allows for an easy reach when operating the tool 10.

So that the hand stays in an ergonomic position, the D-handle 180 could be attached to the top of the shaft 12, so that as the shaft 12 is pulled down and back, the hand may be maintained at roughly the same position, in relation to the arm, as it rotates around the D-handle grip. Moreover, so that the hand doesn't have to slide around the D-handle grip, causing friction, the D-handle grip could be rotatable along its axis, so that a firm grip could be maintained, without causing abrasion.

In other embodiments, the shaft 12 could be angled forward with respect to the blade 14 such as based on alternative holes 76, as previously described, to assume part of the 40 degree pull distance.

An operator may choose to make a second cut line parallel to the first cut line could be made to define the outside edges of a wider trench to be cut; or, a double-bladed tool 210 can be employed to define spaced apart trench edges or even raise soil if a scoop is added.

The foregoing is illustrative of embodiments of the invention and is not to be construed as limiting thereof. Although a few specific example embodiments have been described, those skilled in the art will readily appreciate that many modifications to the disclosed exemplary embodiments, as well as other embodiments, are possible without materially departing from the novel teachings and advantages of the invention.

Accordingly, all such modifications are intended to be included within the scope of the invention as defined in the claims. For example, skilled persons will appreciate that the subject matter of any sentence or paragraph can be combined with subject matter of some or all of the other sentences or paragraphs, except where such combinations are mutually exclusive.

It will be obvious to those having skill in the art that many changes may be made to the details of the above-described embodiments without departing from the underlying principles of the invention. The scope of the present invention should, therefore, be determined by the following claims, with equivalents of the claims to be included therein.

The invention claimed is:

1. A tool, comprising:
   a shaft having a shaft major axis and a shaft length along the shaft major axis between a shaft upper end and a shaft lower end, wherein the shaft has a shaft frontal plane that extends along the shaft length and forms a first cross-section of the shaft having a first cross-sectional dimension that is perpendicular to the shaft major axis, wherein the shaft has a shaft median plane that is transverse to the shaft frontal plane and extends along the length of the shaft and forms a second cross-section of the shaft having a second cross-sectional dimension that is perpendicular to the shaft major axis and the shaft first cross-sectional dimension;
   a blade operatively connected directly or indirectly to the shaft lower end, wherein the shaft is longer than the blade, wherein the blade has a forward edge that includes multiple teeth and faces forward with respect to the shaft frontal plane, wherein the blade has a rearward edge that faces rearward with respect to the shaft frontal plane, wherein the blade has opposing blade surfaces that are between the forward edge and the rearward edge and are transverse to the shaft frontal plane, wherein the forward edge has an upper forward edge portion in proximity to the shaft and a lower forward edge portion in proximity to a blade tip, wherein the rearward edge has an upper rearward edge portion in proximity to the shaft and a lower rearward edge portion in proximity to a blade tip, wherein the blade is configured to move forward along a cut line of desired length while the lower forward edge portion and the lower rearward edge portion of the blade remain beneath the ground surface;
   a step operatively connected directly or indirectly to the blade or the shaft, wherein the step has an upper step surface that is transverse to the shaft median plane and the shaft frontal plane, wherein the step upper surface has a step major dimension, wherein the step upper surface has a step minor dimension that is perpendicular to the step major dimension, and wherein the step major and minor dimensions are both greater than or equal to one or both of the shaft first and second cross-sectional dimensions; and
   a fulcrum with respect to the shaft, wherein the fulcrum is positioned beneath the step and operatively connected to the blade, the shaft, or the step, and wherein the fulcrum functions as a ground stop configured to limit downward progress of the blade beneath a ground surface.

2. The tool of claim 1, wherein the one or more of the opposing blade surfaces is generally parallel to the shaft median plane.

3. The tool of claim 1, wherein the step comprises a major dimension that is greater than or equal to 12 cm.

4. The tool of claim 1, wherein the step has a step distal end that is father from the shaft major axis than is a step proximal end, and wherein the step distal end is greater than or equal to 7 cm from the shaft major axis.

5. The tool of claim 1, wherein the step major dimension is generally parallel to the shaft median plane or one or both of the blade surfaces.

6. The tool of claim 1, wherein the shaft has a shaft front axis, wherein the opposing blade surfaces have a blade total surface area, and wherein more than half of the blade total surface area is positioned behind the shaft front axis.

7. The tool of claim 1, wherein the fulcrum comprises a pivot mechanism that has a diameter that is greater than 2", and wherein the pivot mechanism is positioned beneath the step and operatively connected to the blade, the shaft, or the step.

8. The tool of claim 1, wherein the blade has a side profile that comprises a pronounced curve that extends backwardly.

9. The tool of claim 1, wherein the forward edge of the blade comprises a pronounced curve that includes an arc of greater than or equal to 25 degrees.

10. The tool of claim 1, wherein the forward edge of the blade comprises a pronounced curve having a radius of curvature that is greater than or equal to 3 cm and less than or equal to 10 cm.

11. The tool of claim 1, wherein the shaft has opposing first and second shaft sides that intersect the shaft frontal plane, wherein shaft has first and second shaft side planes that are parallel to the shaft median plane and respectively intersect the shaft frontal plane at the first and second shaft sides, and wherein the entirety of the blade is between the first and second shaft side planes.

12. The tool of claim 1, wherein the blade comprises a blade width or a blade average width between the forward edge of the blade and the rearward edge of the blade, and wherein the blade width or a blade average width is greater than or equal to 5 cm, wherein the blade comprises a blade thickness that is greater than or equal to 0.2 cm, and wherein the blade has a blade length extending from the shaft lower end to a blade tip, and wherein the blade length is greater than or equal to 19 cm.

13. The tool of claim 1, wherein the blade comprises an upper blade width between the forward edge of the blade and the rearward edge of the blade in proximity to the shaft, and wherein the forward edge of the blade extends backward from a forward-most position of the blade edge to behind the shaft frontal plane.

14. The tool of claim 1, wherein the step is configured to have surfaces on both sides of the shaft frontal plane.

15. The tool of claim 1, wherein the step major dimension is oriented at a step angle that is greater than or equal to 93 degrees with respect to the shaft major axis before the tool is employed.

16. The tool of claim 1, wherein the step is operatively pivotally connected to the blade or the shaft such that a distal end of the step upper surface of the step is configured for reversible movement from an undeployed position in a direction toward the shaft upper end.

17. The tool of claim 1, wherein the blade has a vertical axis and wherein the shaft axis is angled forward with respect to the blade axis, or wherein the upper shaft end is operatively connected to a handle that is angled from 2 to 15 degrees forward of the frontal plane.

18. The tool of claim 1, wherein the shaft, blade, and fulcrum are configured so that backward pulling of the shaft toward the ground surface is operable to cause upward and forward movement of the blade in an arc creating a slit forward of the fulcrum, wherein the ground surface above a portion of the slit that is forward of the fulcrum is unbreached in response to the backward pulling of the shaft.

19. The tool of claim 1, wherein the shaft has a shaft rear axis that is parallel to the shaft major axis, and wherein the fulcrum is configured to extend behind the shaft rear axis.

20. The tool of claim 1, wherein the rearward edge has an upper rearward edge portion and a lower rearward edge portion, and wherein the fulcrum is configured to extend behind the upper rearward edge portion.

21. The tool of claim 1, wherein the blade comprises a blade width or a blade average width between the forward edge of the blade and the rearward edge of the blade, wherein the blade has a blade length extending from the shaft lower end to a blade tip, and wherein the blade length is greater than the blade width or the blade average width.

22. The tool of claim 1, wherein the blade and the shaft are non-pivotally connected to each other.

23. A tool, comprising:
a shaft having a shaft front, a shaft rear, a shaft major axis, and a shaft length along the shaft major axis between a shaft upper end and a shaft lower end, wherein the shaft major axis lies along a shaft median plane;
a blade operatively connected to the shaft lower end, wherein the blade and the shaft are non-pivotally connected to each other, wherein the shaft is longer than the blade, wherein the blade has a forward edge, a rearward edge, a blade major plane passing through the forward edge and the rearward edge, and a blade tip, wherein the blade major plane is coplanar with or parallel to the shaft median plane, wherein the rearward edge has an upper rearward edge portion and a lower rearward edge portion, wherein the blade comprises a blade width or a blade average width between the forward edge of the blade and the rearward edge of the blade, wherein the blade has a blade length extending from the shaft lower end to a blade tip, wherein the shaft is longer than the blade, and wherein the blade length is greater than the blade width or the blade average width;
a step operatively connected to the blade or the shaft, wherein the step is operatively connected in proximity to or beneath the shaft lower end; and
a fulcrum with respect to the shaft and the blade, wherein the fulcrum is positioned beneath the step and operatively connected to the blade, the shaft, or the step, wherein the fulcrum has a cross-sectional dimension in a cross-sectional plane that extends rearward from the shaft major axis, wherein the cross-sectional dimension of the fulcrum is greater than 5 cm, and wherein the fulcrum is configured to extend behind the upper rearward edge portion of the blade.

24. A tool, comprising:
a shaft having a shaft major axis and a shaft length along the shaft major axis between a shaft upper end and a shaft lower end, wherein the shaft has a shaft frontal plane that extends along the shaft length and forms a first cross-section of the shaft having a first cross-sectional dimension that is perpendicular to the shaft major axis, wherein the shaft has a shaft median plane that is transverse to the shaft frontal plane and extends along the length of the shaft and forms a second cross-section of the shaft having a second cross-sectional dimension that is perpendicular to the shaft major axis and the shaft first cross-sectional dimension;
a blade operatively connected directly or indirectly rigidly to the shaft lower end, wherein the blade and the shaft are non-pivotally connected to each other, wherein the shaft is longer than the blade, wherein the blade has a forward edge that includes multiple teeth and faces forward with respect to the shaft frontal plane, wherein the blade has a rearward edge that faces rearward with respect to the shaft frontal plane, wherein the blade has opposing blade surfaces that are between the forward edge and the rearward edge and are transverse to the shaft frontal plane, wherein the forward edge of the blade comprises a pronounced curve that includes an arc of greater than or equal to 25 degrees; and a step operatively connected directly or indirectly to the blade or the shaft, wherein the step has an upper step surface that is transverse to the shaft median plane and the shaft frontal plane, wherein the step upper surface has a step major dimension, wherein the step upper surface has a step minor dimension that is perpendicular to the step major dimension, and wherein the step major and minor dimensions are both greater than or equal to one or both of the shaft first and second cross-sectional dimensions.

25. A tool comprising:

a shaft having a shaft front, a shaft rear, a shaft major axis, and a shaft length along the shaft major axis between a shaft upper end and a shaft lower end, wherein the shaft major axis lies along a shaft median plane;

a blade operatively connected to the shaft lower end, wherein the shaft is longer than the blade, wherein the blade has a forward edge, a rearward edge, a blade major plane passing through the forward edge and the rearward edge, and a blade tip, wherein the blade major plane is coplanar with or parallel to the shaft median plane, wherein the rearward edge has an upper rearward edge portion and a lower rearward edge portion, wherein the blade comprises a blade width or a blade average width between the forward edge of the blade and the rearward edge of the blade, wherein the blade has a blade length extending from the shaft lower end to a blade tip, wherein the shaft is longer than the blade, wherein the blade length is greater than the blade width or the blade average width, wherein the forward edge has an upper forward edge portion in proximity to the shaft and a lower forward edge portion in proximity to a blade tip, wherein the rearward edge has an upper rearward edge portion in proximity to the shaft and a lower rearward edge portion in proximity to a blade tip, wherein the blade is configured to move forward along a cut line of desired length while the lower forward edge portion and the lower rearward edge portion of the blade remain beneath the ground surface;

a step operatively connected to the blade or the shaft, wherein the step is operatively connected in proximity to or beneath the shaft lower end; and a fulcrum with respect to the shaft and the blade, wherein the fulcrum comprises a pivot mechanism, wherein the fulcrum is positioned beneath the step and operatively connected to the blade, the shaft, or the step, wherein the fulcrum has a cross-sectional dimension in a cross-sectional plane that extends rearward from the shaft major axis, wherein the cross-sectional dimension of the fulcrum is greater than 5 cm, wherein the fulcrum is configured to extend behind the upper rearward edge portion of the blade, wherein the shaft, blade, and pivot mechanism are configured so that backward pulling of the shaft toward the ground surface is operable to cause upward and forward movement of the blade in an arc creating a slit forward of the pivot mechanism, and wherein the ground surface above a portion of the slit that is forward of the fulcrum is unbreached in response to the backward pulling of the shaft.

26. A tool, comprising:

a shaft having a shaft major axis and a shaft length along the shaft major axis between a shaft upper end and a shaft lower end, wherein the shaft has a shaft frontal plane that extends along the shaft length and forms a first cross-section of the shaft having a first cross-sectional dimension that is perpendicular to the shaft major axis, wherein the shaft has a shaft median plane that is transverse to the shaft frontal plane and extends along the length of the shaft and forms a second cross-section of the shaft having a second cross-sectional dimension that is perpendicular to the shaft major axis and the shaft first cross-sectional dimension;

a blade operatively connected directly or indirectly to the shaft lower end, wherein the shaft is longer than the blade, wherein the blade has a forward edge that includes multiple teeth and faces forward with respect to the shaft frontal plane, wherein the blade has a rearward edge that faces rearward with respect to the shaft frontal plane, wherein the blade has opposing blade surfaces that are between the forward edge and the rearward edge and are transverse to the shaft frontal plane, wherein the blade comprises a blade width or a blade average width between the forward edge of the blade and the rearward edge of the blade, and wherein the blade width or a blade average width is greater than or equal to 5 cm, wherein the blade comprises a blade thickness that is greater than or equal to 0.25 cm, and wherein the blade has a blade length extending from the shaft lower end to a blade tip, and wherein the blade length is greater than or equal to 19 cm; and a step operatively connected directly or indirectly to the blade or the shaft, wherein the step has an upper step surface that is transverse to the shaft median plane and the shaft frontal plane, wherein the step upper surface has a step major dimension, wherein the step upper surface has a step minor dimension that is perpendicular to the step major dimension, and wherein the step major and minor dimensions are both greater than or equal to one or both of the shaft first and second cross-sectional dimensions.

27. A tool, comprising:

a shaft having a shaft major axis and a shaft length along the shaft major axis between a shaft upper end and a shaft lower end, wherein the shaft has a shaft frontal plane that extends along the shaft length and forms a first cross-section of the shaft having a first cross-sectional dimension that is perpendicular to the shaft major axis, wherein the shaft has a shaft median plane that is transverse to the shaft frontal plane and extends along the length of the shaft and forms a second cross-section of the shaft having a second cross-sectional dimension that is perpendicular to the shaft major axis and the shaft first cross-sectional dimension;

a blade operatively connected directly or indirectly to the shaft lower end, wherein the shaft is longer than the blade, wherein the blade has a forward edge that includes multiple teeth and faces forward with respect to the shaft frontal plane, wherein the blade has a rearward edge that faces rearward with respect to the shaft frontal plane, wherein the blade has opposing blade surfaces that are between the forward edge and the rearward edge and are transverse to the shaft frontal plane;

a step operatively connected directly or indirectly to the blade or the shaft, wherein the step has an upper step surface that is transverse to the shaft median plane and the shaft frontal plane, wherein the step upper surface has a step major dimension, wherein the step upper surface has a step minor dimension that is perpendicular to the step major dimension, and wherein the step major and minor dimensions are both greater than or equal to one or both of the shaft first and second cross-sectional dimensions; and a fulcrum with respect to the shaft, wherein the fulcrum is positioned beneath the step and operatively connected to the blade, the shaft, or the step, wherein the fulcrum functions as a ground stop configured to limit downward progress of the blade beneath a ground surface, wherein the rearward edge has an upper rearward edge portion and a lower rearward edge portion, and wherein the fulcrum is configured to extend behind the upper rearward edge portion.

28. A tool, comprising:

a shaft having a shaft major axis and a shaft length along the shaft major axis between a shaft upper end and a shaft lower end, wherein the shaft has a shaft frontal plane that extends along the shaft length and forms a first cross-section of the shaft having a first cross-sectional dimension that is perpendicular to the shaft major axis, wherein the shaft has a shaft median plane that is transverse to the shaft frontal plane and extends along the length of the shaft and forms a second cross-section of the shaft having a second cross-sectional dimension that is perpendicular to the shaft major axis and the shaft first cross-sectional dimension;

a blade operatively connected directly or indirectly to the shaft lower end, wherein the shaft is longer than the blade, wherein the blade has a forward edge that includes multiple teeth and faces forward with respect to the shaft frontal plane, wherein the blade has a rearward edge that faces rearward with respect to the shaft frontal plane, wherein the blade has opposing blade surfaces that are between the forward edge and the rearward edge and are transverse to the shaft frontal plane, wherein the blade comprises a blade width or a blade average width between the forward edge of the blade and the rearward edge of the blade, wherein the blade has a blade length extending from the shaft lower end to a blade tip, and wherein the blade length is greater than the blade width or the blade average width;

a step operatively connected directly or indirectly to the blade or the shaft, wherein the step has an upper step surface that is transverse to the shaft median plane and the shaft frontal plane, wherein the step upper surface has a step major dimension, wherein the step upper surface has a step minor dimension that is perpendicular to the step major dimension, and wherein the step major and minor dimensions are both greater than or equal to one or both of the shaft first and second cross-sectional dimensions; and a fulcrum with respect to the shaft, wherein the fulcrum is positioned beneath the step and operatively connected to the blade, the shaft, or the step, and wherein the fulcrum functions as a ground stop configured to limit downward progress of the blade beneath a ground surface.

\* \* \* \* \*